US008255004B2

(12) United States Patent
Huang et al.

(10) Patent No.: US 8,255,004 B2
(45) Date of Patent: Aug. 28, 2012

(54) METHODS AND SYSTEMS FOR COMMUNICATING USING VARIABLE TEMPERATURE CONTROL

(75) Inventors: Joseph Jyh-Huei Huang, San Diego, CA (US); Samuel Jacob Horodezky, San Diego, CA (US); Ankur Jalota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 12/388,126

(22) Filed: Feb. 18, 2009

(65) Prior Publication Data

US 2010/0210313 A1 Aug. 19, 2010

(51) Int. Cl.
*H04B 1/38* (2006.01)
(52) U.S. Cl. ..................................... 455/567; 455/456.1
(58) Field of Classification Search ............... 455/550.1, 455/566–575.9, 90.1–90.3
See application file for complete search history.

(56) References Cited

U.S. PATENT DOCUMENTS

| 6,362,740 B1 * | 3/2002 | Jung | 340/584 |
| 2006/0116175 A1 * | 6/2006 | Chu | 455/567 |

FOREIGN PATENT DOCUMENTS

| EP | 1100060 A2 | 5/2001 |
| WO | WO2005064895 A1 | 7/2005 |
| WO | WO2007030603 A2 | 3/2007 |

OTHER PUBLICATIONS

International Search Report & Written Opinion—PCT/US2010/024596, International Search Authority—European Patent Office—May 31, 2010.

* cited by examiner

*Primary Examiner* — Shawki S Ismail
*Assistant Examiner* — Jany Tran
(74) *Attorney, Agent, or Firm* — James T. Hagler

(57) ABSTRACT

Information can be communicated by a temperature change of a communication device equipped with one or more temperature modifying elements. A processor configured by software determines when a temperature change should be generated and accomplishes such a change by controlling the application of power to the temperature modifying element(s). The temperature modifying elements may be electric resistance heating elements, thermoelectric elements, or other elements. Users perceive the temperature change produced by the temperature modifying element(s) when they touch the device. Depending on user settings, the temperature change may communicate specific information to the user. For example, a temperature change may convey information regarding the importance of an incoming telephone call, e-mail message or SMS message, or the importance of an impending calendar event. Using temperature as a communication medium allows the communication device to convey information to a user being notice by others.

35 Claims, 20 Drawing Sheets

| Name | Priority | Temp | Ring Style | Mode | Communication Type |
|---|---|---|---|---|---|
| John Doe | Important | Heat | Silence | Meeting | Phone Call |
| Jane Doe | Not Important | None | Silence | Meeting | SMS |
| Jack Doe | Not Important | None | Vibrate | Meeting | Email |
| Jeremy Doe | Very Important | Heat | Vibrate | Meeting | Page |
| June Doe | Most Important | Heat | Tone 2 | Normal | SMS |

FIG. 6

| Name | Priority | Temp | Ring Style | Mode | Communication Type |
|---|---|---|---|---|---|
| John Doe | Important | Heat | Silence | Meeting | Phone Call |
| Jane Doe | Avoid | Cool | Silence | Meeting | SMS |
| Jack Doe | Not Important | None | Silence | Meeting | Email |
| Jeremy Doe | Highly Important | Heat | Vibrate | Meeting | Page |
| June Doe | Avoid | None | Silence | Normal | SMS |
| Jonas Doe | Most Important | Heat | Tone | Meeting | SMS |

FIG. 7

METHODS AND SYSTEMS FOR COMMUNICATING USING VARIABLE TEMPERATURE CONTROL

FIELD OF THE INVENTION

The present invention relates generally to the field of communications, and more specifically to using varying temperatures in communicating information to users computing devices.

BACKGROUND

The current information driven environment makes effective and accurate data communication more important than ever. To convey information to users, communication devices take advantage of the user's senses. Visual displays present information that can be seen, such as caller information and animated graphics. Speakers present information that be heard, such as ring tones. Shakers present information that can be felt, such as vibration to indicate an incoming call. However, methods of communicating using these three methods may not address all situations, particularly when the communication device is out of sight and the user does not want others to hear ring tones or vibration.

SUMMARY

The various embodiments provide methods and systems for communicating information to users employing thermoception, which is the perception of temperature. A communication device includes a temperature modifying element, such as an electric resistance heating element or a thermoelectric element, whose activation is controlled by a processor. The processor determines when a temperature change should be generated to convey information to a user. Information is communicated to the users when users feel the change in the temperature of the communication device, such as when they touch a portion of the device where the temperature change is affected. In an embodiment, the information to be communicated by thermoception relates to data received by the communication device. In another embodiment the information to be communicated by thermoception relates to an incoming telephone call directed to the communication device. In another embodiment the information to be communicated by thermoception relates to an e-mail or SMS message received by the communication device. In another embodiment the information to be communicated by thermoception relates to received temperature data, such as an outside temperature. In another embodiment the information to be communicated by thermoception relates to a geographic position of the communication device. Information may be communicated by causing the outside surface of the communication device to warm up and/or cool down compared to ambient temperature, and such temperature changes may be accomplished on different parts of the device, such as displays, keys, control elements, or portions of its housing.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 6 illustrates a data structure suitable for use according to an embodiment.

FIG. 7 illustrates a data structure suitable for use according to an embodiment.

DETAILED DESCRIPTION

In this description, the terms "exemplary" is used herein to mean "serving as an example, instance, or illustration." Any implementation described herein as "exemplary" is not necessarily to be construed as preferred or advantageous over other implementations.

As used herein, the terms "communication device," "computing device," "mobile device" and "portable computing device" refer to any one or all of cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), wireless network transceiver cards for use in a personal computer, wireless game controllers, and similar personal electronic devices which include a programmable processor and memory and the capability to connect to a wireless network. For example, a wireless game controller is a communication device which can communicate user button and lever actuations to and receive game information communication from a gaming console. The terms may also encompass personal computers, such as a laptop computer or a desktop computer, with wired and wireless network transceiver circuits or when used in the description of the various embodiments which may also be implemented on or with personal computers.

Current communication devices convey information to users via their senses of sight, hearing and touch. Liquid crystal displays communicate information visually. Speakers communicate information as sound, such as ring tones. Shakers communicate information as vibrations, such as vibrating to indicate an incoming telephone call. Sophisticated gaming devices, such as game chairs, may also use the sense of proprioception to provide gamers with a more realistic feel of a game by changing the users' body position in space.

Although current communication devices utilize an array of users' senses, other human sensory methods have yet to be exploited for information communication. One such method is thermoception, which is the ability to sense heat or cold by the skin. Varying the temperature of a communication device can convey information to users without requiring the use of other senses (i.e., the senses of sight and hearing). The present invention employs the touch sense of temperature, either alone and in combination with other senses, to communicate information to users. Varying the temperature of a communication device can convey information to users in a very personal manner that others cannot see, hear or feel.

Figure 1:
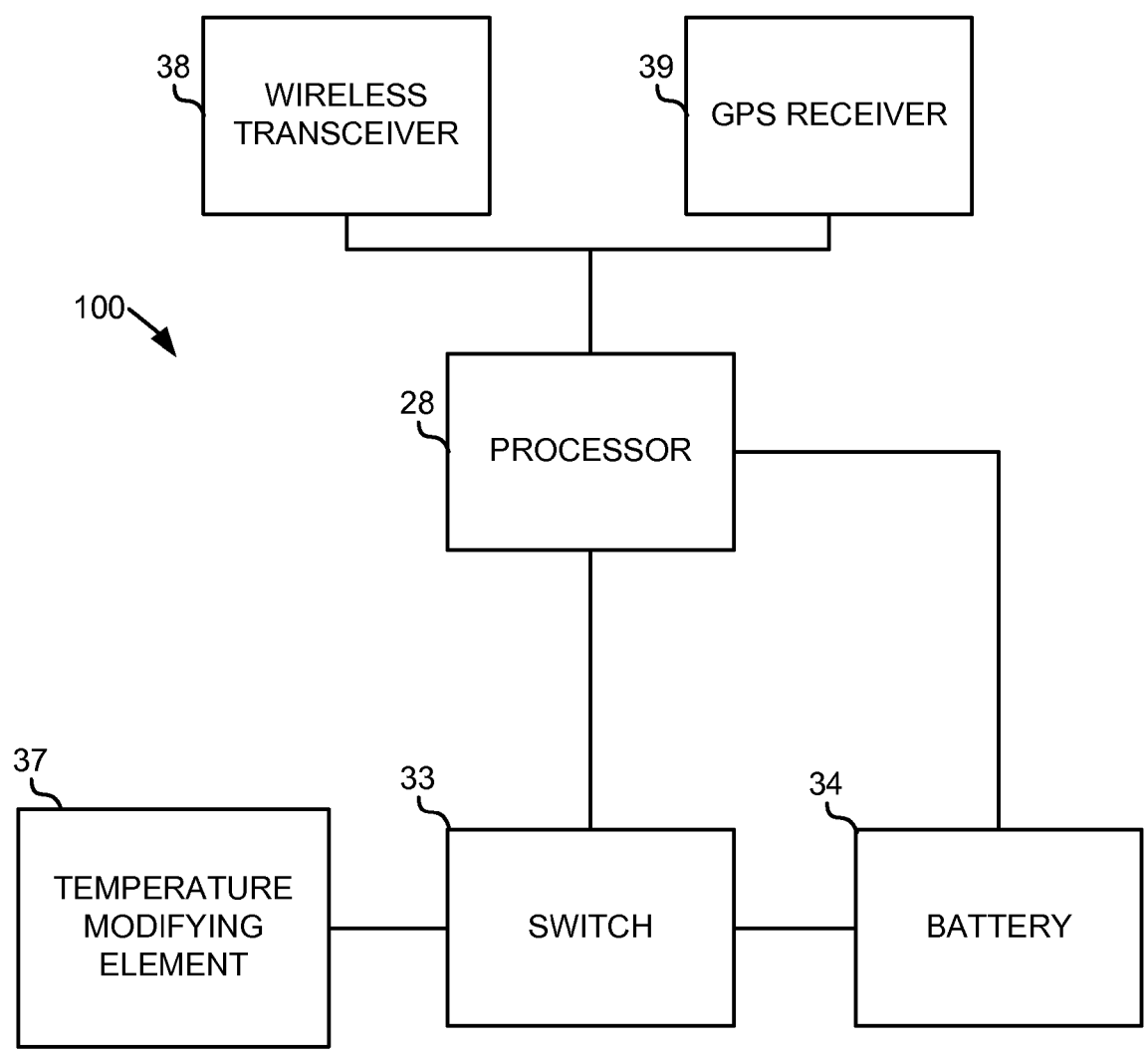
FIG. 1 is a system block diagram of a communication device including a temperature modifying element.

FIG. 1 is a system block diagram of a communication device 100 that uses a change in temperature to convey information to users. In the various embodiments, a communication device includes a temperature modifying element 37 controlled by a processor 28 which is configured to convey information to a user in the form of temperature changes perceivable on the surface of the device. Communication devices 100 may be configured to allow users to set criteria and parameters for causing a temperature change to occur in response to internal or received data. As a first example, temperature changes may be used to signal events stored in a calendar application operating in the communication device 100, such as a meeting reminder or an alarm. When the user feels the communication device 100 becoming warmer or colder, the user will be reminded of the meeting or event without disturbing others with a visual or audible communication. As a second example, users may program their communication device 100 to change temperature upon receiving an incoming call depending upon pre-set instructions tied to caller identifiers (ID), such as telephone numbers or a match to a contact stored in an address book database. For example, a user may configure the communication device 100 to become hotter (i.e., generate heat perceptible on a surface) when an incoming call is from person H, cause no change in temperature when an incoming call is from person N and become colder (i.e., transfer heat away from the surface) when an incoming call is from person C. Communication devices 100 may also be pre-programmed to generate heat for certain received data, stay neutral for some data and become cold for other data.

Figure 2A:
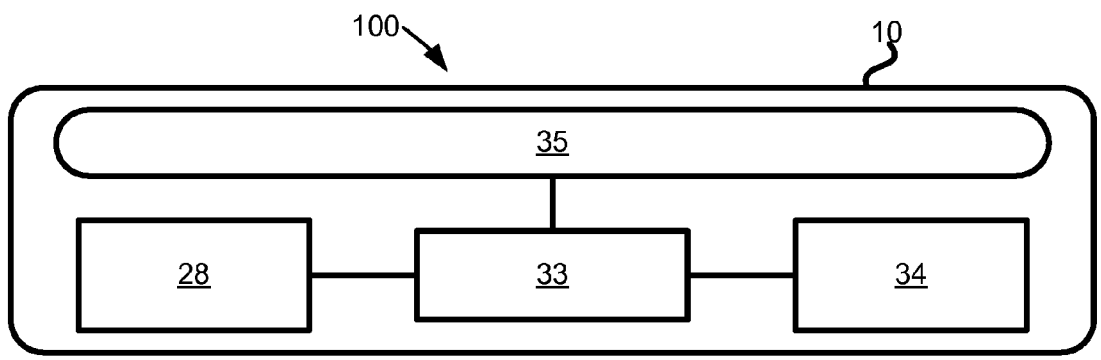
FIG. 2A is a component block diagram of a communication device with an electric resistance heating element suitable for use with the various embodiments.
Figure 3A:
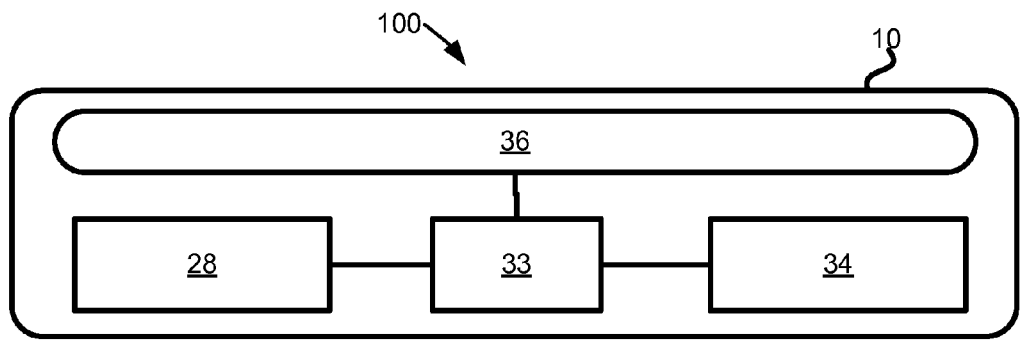
FIG. 3A is a component block diagram of a communication device with a thermoelectric elements suitable for use with the various embodiments.

To cause a change in temperature of a communication device 100, the device may employ one or more temperature modifying elements 37 such as electric resistance heating elements 35 (see FIG. 2A) and/or thermoelectric elements 36 (see FIG. 3A). Electric resistance heating elements 35 are circuit elements which transform electrical current into heat by resisting the flow of electricity. Thermoelectric elements on the other hand exhibit a thermoelectric effect which is the conversion of electric potential into forced thermal conduction which creates temperature differences across the element. When heat flows through a thermoelectric element an electrical potential is generated, an effect that has been used to power space probes sent to Jupiter, Saturn and beyond. When an electrical potential is applied to a thermoelectric element, heat flows through the device thereby generating different temperatures on the different sides of the element. As heat is caused to flow from one side of the thermoelectric element to the other, one side will become hotter while the other side will become colder. Thermoelectric elements used for cooling devices are well known in the art and are commonly known as "Peltier" elements. Peltier elements are used as solid state cooling devices, such as in cooling plates for microprocessors and in solid state refrigerators. Since thermoelectric elements cause heat to flow from one side to the other, communication devices equipped with thermoelectric elements can communicate information by making a surface feel colder.

The various embodiments may employ either electric resistance heating elements 35 or thermoelectric elements 36 or both. Also, since thermoelectric elements 36 (i.e., Peltier elements) cause heat to flow through the element in a direction that depends upon the polarity of the applied electrical potential, such temperature modifying elements can be used to produce either a cool exterior (by causing heat to flow into the communication device 100) or a hot exterior (by causing heat to flow out of the communication device 100).

Referring to FIG. 1, a communication device 100 may include a processor 28, a temperature modifying element 37, a battery 34, and a switch 33 coupled between the battery 34 and the temperature modifying element 37. The switch is also connected to the processor 28 and configured to electrically connect the battery 34 or other power supply (not shown) to the temperature modifying element 37 in response to signals received from the processor 28. When connected, the battery 34 provides electrical power to the temperature modifying element 37 sufficient to generate a temperature change effect (i.e., heating or cooling). The processor 28 is configured by software to determine when temperature-based communication is appropriate and to send a signal to the switch 33 when it determines that the temperature modifying element 37 should be activated. The processor 28 may be configured by software to allow users to set instructions for activating the temperature modifying element 37, such as setting priorities for selected events, callers, etc. for which a temperature-based communication is appropriate. The processor 28 may be further configured by software to received data related to a communication (e.g., a caller ID, an e-mail message priority or sender ID, or an SMS message priority or sender ID, for example), determine the priority of the received data based on user pre-set instructions and transmit signals to the switch 3e to effectuate a change in temperature based on user settings and the received data.

The switch 33 may be any type of circuit element which can connect a source of electrical energy to another circuit based on a signal from a processor, including but not limited to a relay circuit, a solid state relay circuit, a transistor, a power amplifier, and similar circuit elements known in the electronic arts. The switch 33 may be a separate circuit element, may be a circuit element within the processor 28, or may be an element of another circuit device. Also, the switch 33 may be integrated with the temperature modifying element 37 such in the form of a controllable temperature modifying element 37 that can be coupled to the processor 28 and to the battery 34 or other power supply (not shown).

The temperature modifying element 37 may be any circuit which can cause a temperature change. For illustrative purposes, as the temperature modifying element 37 is describe herein as either an electric resistance heating element 35 (see FIG. 2A) for causing a temperature rise, or a thermoelectric element 36 (see FIG. 3A) for causing a temperature decrease (at least on one side of the communication device 100). However, other types of temperature modifying elements may be used, such as a circuit element which generates waste heat (e.g., a power amplifier or a transmitter circuit), or variable insulation which can be altered (e.g., by applying an electric potential) to permit or inhibit heat to flow from internal circuitry of the communication device.

The processor 28 may be coupled to a wireless transceiver 38 configured to communicate with wireless cellular telephone and/or data networks, such as to receive cellular telephone calls, SMS messages, or e-mail messages, or send and receive messages via the Internet. Also, the processor 28 may be coupled to other sensors and sources of information, such as a Global Positioning System (GPS) receiver 39 which can provide coordinate position information to the processor 39.

The processor 28 can be configured by software to activate the temperature modifying element 37 in response to a wide variety of events, received data or satisfied criteria, some examples of which are described herein. Events for which a temperature communication is appropriate may be internal events (e.g., events received from or identified by applications running on the communication device) or external events (e.g., events which occur or arise outside the communication device). Practically any form of received data may be used as triggers for activating a temperature change signal. Similarly, a wide variety of communicating device conditions, modes or state criteria may be set and used as triggers for activating a temperature change signal. In short, practically any circumstance for which an audio signal might be appropriate can be used as triggers for activating a temperature change communication.

Example internal events which may be communicated via a temperature change include: scheduled events saved in a calendar application, such as a meeting or a reminder of a task due; alarms saved in a clock application; an elapsed time counter; and a count-down timer. For internal events, the processor 28 is configured by software to recognize when an internal event is occurring or imminent, determine the appropriate temperature signal to send (hot or cold and degree), and control the switch 33 as required to generate that temperature signal.

Examples of external events which may be communicated via a temperature change include: a change in a wireless network; a change in wireless network signal strength; and warnings (e.g., storm warnings or emergency alerts) received from an external network. For external events, the processor 28 is configured by software to receive the event or recognize when an external event is received, determine the appropriate temperature signal to send (hot or cold and degree), and control the switch 33 as required to generate that temperature signal.

Examples of received data which may prompt a temperature change signal include: an incoming telephone call including the telephone number of the caller; a received SMS (or similar) message including the telephone number of the sender and an importance flag; a received e-mail including the sender's address and an importance flag; data received from an Internet website; and position data received from a GPS receiver. As described in more detail below, the processor 28 is configured by software to receive data, determine whether a temperature signal should be generated based upon the received data, determine the appropriate temperature signal to send (hot or cold and degree), and control the switch 33 as required to generate that temperature signal.

Examples of satisfied criteria which may prompt a temperature change signal include: establishing or losing a Blue-Tooth data link; battery energy reaching a minimum threshold; initiation of the roaming communications mode; and a change in operating mode. The processor 28 is configured by software to recognize when a temperature signal criteria is satisfied, determine the appropriate temperature signal to send (hot or cold and degree), and control the switch 33 as required to generate that temperature signal.

In addition to controlling the activation of the temperature modifying element 37, the processor 28 may further be configured by software to regulate a temperature change, such as causing the temperature to rise slowly or incrementally from warm to hot, such as to communicate that the time of a meeting is approaching. In this manner, a series of audible or vibration alarm reminders can be replaced by a gradual temperature increase that grows progressively hotter as the time to the event becomes shorter. The processor 28 may regulate the temperature modifying element 37 by activating and deactivating the switch 33, using the ratio of activated time to deactivated time to control the temperature change. Alternatively, the switch 33 may be configured to regulate the amount of current flowing from the battery 34 to the temperature modifying element 37 in response to signals received from the processor 28. An example of such a regulating switch 33 is a power amplifier. In this configuration, the processor 28 can regulate the temperature modifying element 37 by varying the signal provided to the switch 33. By so regulating the temperature modifying element 37, the processor 28 can be configured to generate a variety of perceptible temperature ranges, such as from cold, to cool, to ambient (not change), to warm, to hot. Alternatively, the processor 28 may be configured to regulate the temperature modifying element 37 to produce a particular approximate temperature.

FIGS. 2A-2D are component block diagrams of embodiments of a communication device 100 equipped with an electric resistance heating element 35. As illustrated in FIG. 2A, a communication device 100 may include a processor 28, a switch 33 coupled to the processor 28 and configured to connect the electric resistance heating element 35 to a battery 34. The battery 34 also provides power to the processor 28 and to other circuit elements such as a transceiver 38 and/or GPS receiver 39 (see FIG. 1). All of the active elements involved in the embodiment can be encased in a case or housing 10. The electric resistance heating element 35 may be situated near to or in contact with the housing 10 wall so that heat from the heating element 35 is readily conducted to the outside surface of the communication device 100. Thermally coupling the heating element 37 to the housing 10 allows users to feel the temperature rise on their skin in contact with the housing 10. In an alternative embodiment which is not shown separately but conceptually consistent with the embodiment shown in FIG. 2A, the housing 10 itself may be made from or incorporate the electric resistance heating element 35. This alternative may allow the design of the communication device 100 to be simpler by reducing the number of structural elements involved.

Figure 2B:
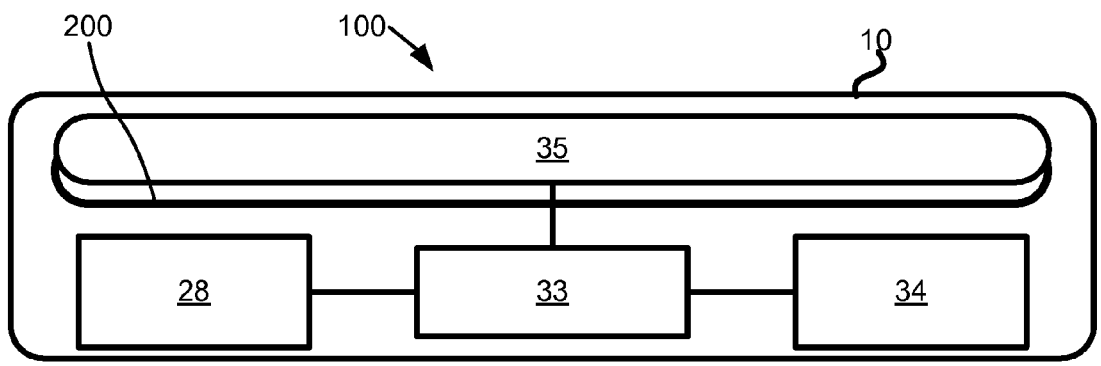
FIG. 2B is a component block diagram of a communication device with an electric resistance heating element and thermal insulation suitable for use with the various embodiments.

In another embodiment illustrated in FIG. 2B, the electric resistance heating element 35 may be insulated by thermal insulation 200 so that the heat generated by the electric resistance heating element 35 will not damage nearby components. For example, the portion or side of the electric resistance heating element 35 that is adjacent to the processor 28, switch 33, and battery 34 may be insulated using thermal insulation 200 so that the heat from the electric resistance heating element 35 preferably flows out through the housing 10, thereby limiting the internal temperature. Thermal insulation materials and their use in communication devices are well known in the art, and any suitable thermal insulation may be used in this embodiment.

Figure 2C:
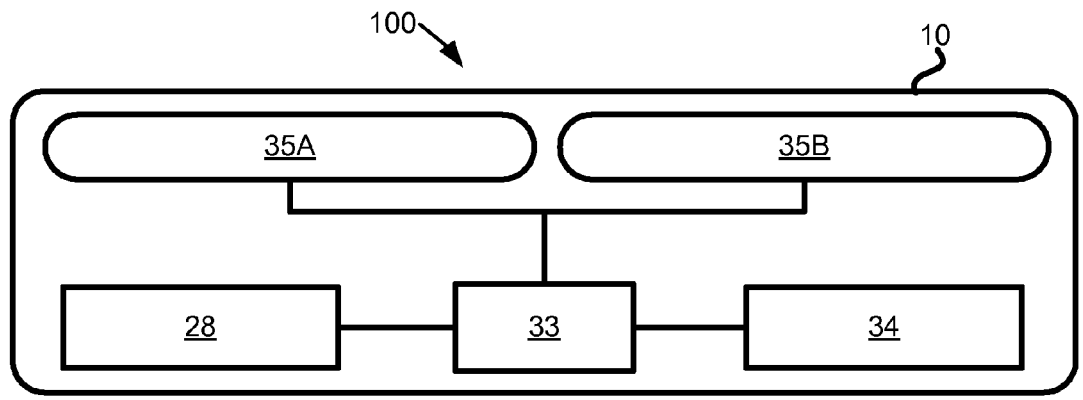
FIG. 2C is a component block diagram of a communication device with multiple electric resistance heating elements suitable for use with the various embodiments.

In a further embodiment illustrated in FIG. 2C, more than multiple electric resistance heating elements 35 temperature changes may be used to allow different temperature changes to be localized to certain parts of a communication device 100. The switch 33 may be configured to separately or jointly connect the two (or more) electric resistance heating elements 35A, 35B to the battery 34 in response to signals from the processor 28. In this embodiment, temperature change signals may be affected at several different localized positions on the communication device 100 at the same time. For example, the communication device may include two separately controlled electric resistance heating elements 35A, 35B so that three different signals can be conveyed by: (1) heating the first element 35A while not heating the second element 35B; (2) heating the second element 35B while not heating the first element 35A; or (3) heating both elements 35A, 35B simultaneously. Further, the heating of the two elements 35A, 35B may be alternated. This embodiment may be useful to convey more information than possible with a single heating element 35. For example, a gaming control device, such as a wireless game controller communication device, may include electric resistance heating elements 35A, 35B in several parts of the device so that temperature changes can be provided to communicate a variety of game information to the user (e.g., external temperature, health condition, sensed threats, etc.). Thus, a wireless joystick gaming control device may be configured with the heating elements 35 illustrated in FIG. 2C to heat up when the game character is hurt by a blast in a war game, for example.

Figure 2D:
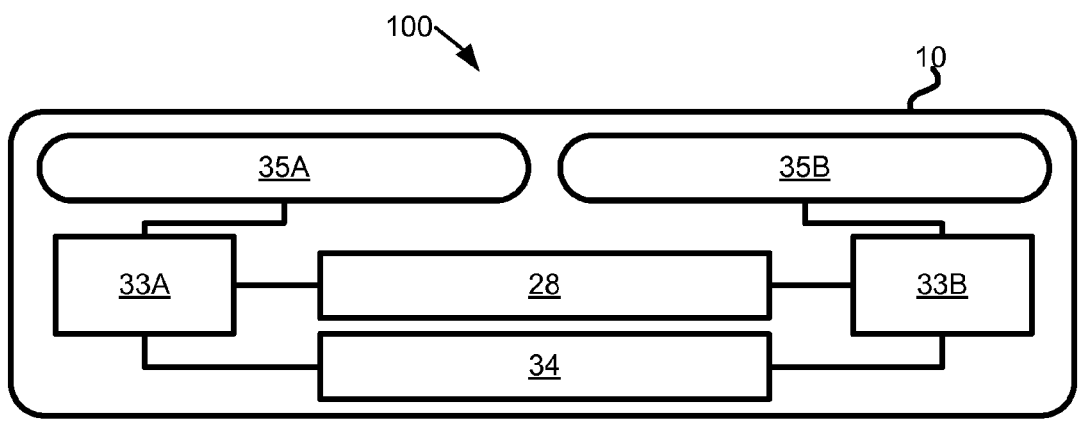
FIG. 2D is a component block diagram of a communication device with multiple electric resistance heating elements and multiple switches suitable for use with the various embodiments.

FIG. 2D illustrates another embodiment in which multiple electric resistance heating elements 35A, 35B are provided with each connected to a dedicated control switch 33A, 33B, respectively. Providing multiple switches 33A, 33B for activating multiple electric resistance heating elements 35A, 35B provides greater flexibility in controlling the heating elements. For example, providing multiple switches 33A, 33B and multiple electric resistance heating elements 35A, 35B may be useful in gaming control devices. In such a gaming control device, one electric resistance heating elements 35A may be positioned under the firing button so that it may heat up when ammunition is low, for example, thereby signaling to the gamer that it is time to either reload or conserve ammunition without requiring the user to look away from the primary scene of the game. Similarly, the temperature of the joystick handle may be increased by an electric resistance heating element 35B to signal when the life-line of the game character is nearly exhausted, signaling to the gamer that it is time to take precautionary measures to conserve or increase the life-line. As a further example, both the joystick and the firing buttons may heat up to signal the demise of the game character.

FIGS. 3A-3D are component block diagrams of a communication device 100 equipped with a thermoelectric element 36 capable of relaying information by generating either hot and cold surface temperatures. In the embodiment illustrated in FIG. 3A a communication device 100 includes a processor 28 in communication with a switch 33 configured to connect the battery 34 to a thermoelectric element 36. The battery provides the electric potential required to cause heat to flow through the thermoelectric element 36. The processor 28, switch 33, battery 34 and thermoelectric element 36 are located in a housing 10. The switch 33 connects the battery to the thermoelectric element 36 in response to control signals from the processor 28, and may be configured to vary the polarity of the battery-to-element connection in response to signals from the processor 28. Thus, the processor 28 may send control signals to the switch 33 to cause the thermoelectric element 36 to conduct heat away from or towards the exterior of the housing 10. In this manner the processor can control whether a user will feel heat or cold when they touch the housing 10 to their skin. As with the embodiment described above with reference to FIG. 2A, the thermoelectric element 36 may be thermally coupled to the housing 10 by being situated close to, adjoining or within the wall of the housing 10 in order to facilitate thermal conduction from/to the exterior of the communication device 100.

Figure 3B:
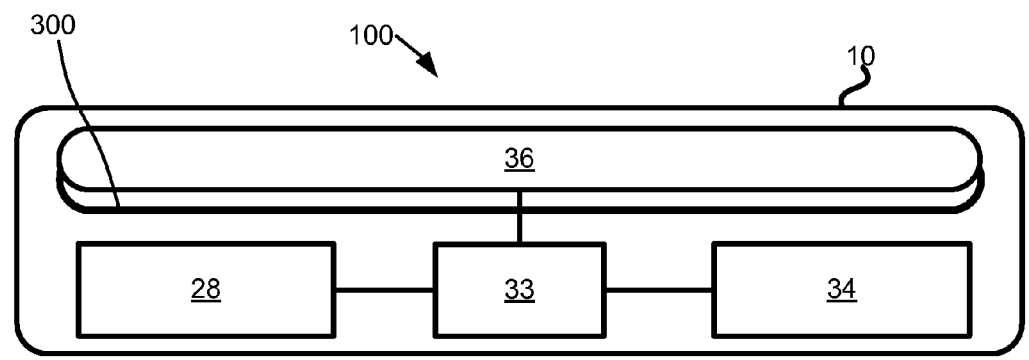
FIG. 3B is a component block diagram of a communication device with a thermoelectric element and thermal insulation suitable for use with the various embodiments.

As illustrated in FIG. 3B, thermoelectric element 36 may also be insulated by thermal insulation 300 to protect neighboring device components from being damaged by heat transferred from the exterior to the interior of the communication device 100. For example, electrical insulation 300 may cover the portion or side of the thermoelectric element 36 that is adjacent to the processor 28, switch 33 and battery 34. Such thermal insulation 300 may protect these components from being overheated when the thermoelectric element 36 is energized to cool the exterior of the communication device 100. Similarly, the thermal insulation 300 can protect the processor 28, switch 33 and battery 34 from being chilled, which could cause condensation to form, when the thermoelectric element 36 is energized with the polarity which pumps heat to the exterior of the communication device 100.

Figure 3C:
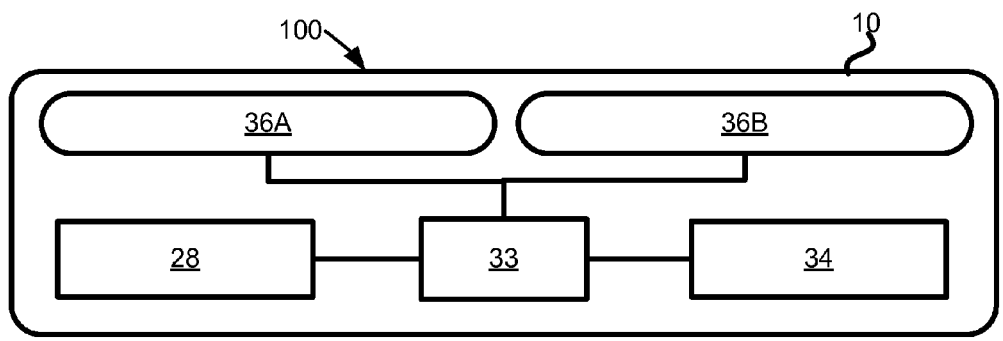
FIG. 3C is a component block diagram of a communication device with multiple thermoelectric elements suitable for use with the various embodiments.

In an embodiment illustrated in FIG. 3C, a communication device 100 may include more than one thermoelectric element 36A, 36B connected to a switch 33. The switch 33 may be configured to separately or jointly connect the two (or more) thermoelectric elements 36A, 36B to the battery 34 in response to signals from the processor 28. In this embodiment, more than one location on a communication device 100 may demonstrate a change in temperature at the same time. Also, because thermoelectric elements are capable of producing heat or cold depending upon the polarity of the applied electric potential, the different locations on a communication device 100 may demonstrate different temperatures. For example, in a gaming control communication device, information about the game may be communicated to the user using more than one thermoelectric element 36A, 36B controlled by the processor 28 via the switch 33. Thus, the temperature of a joystick and the firing button of a gaming control device may decreased simultaneously, signaling to the user that the game character has entered a level in the game that takes place in cold climates, for example. Alternatively, the temperature of the joystick and the firing button of the gaming control device may increase simultaneously, signaling to the user that the game character has entered a level in the game that takes place in a hot climate, for example. Further, the temperature of the joystick may be decreased while the temperature of the firing button is increased.

Figure 3D:
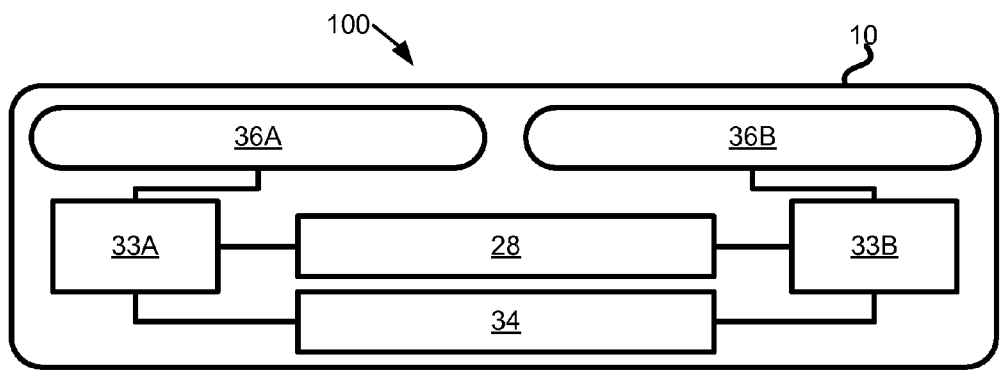
FIG. 3D is a component block diagram of a communication device with multiple thermoelectric elements and multiple switches suitable for use with the various embodiments.

FIG. 3D illustrates an embodiment of a communication device 100 that includes more then one thermoelectric element 36A, 36B connected to more than one switch 33A, 33B. This embodiment may enable the processor 28 to better control temperatures exhibited in different locations on a communication device 100 at different times and/or at different temperatures. For example, in a gaming control communication device, the temperature of a joystick may changed based on the climate as shown in the game and the temperature of the firing button may change based on the amount of ammunition available, with the rate at which the different temperature changes are implemented varying.

Figure 3E:
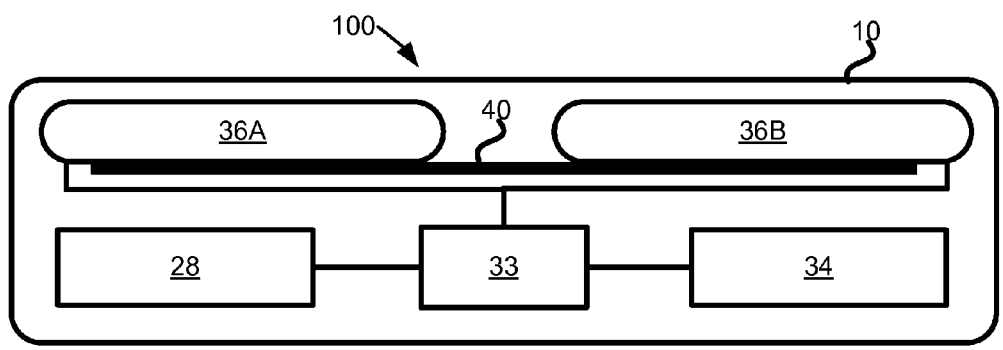
FIG. 3E is a component block diagram of a communication device with multiple thermoelectric elements coupled to a thermal conductor suitable for use with the various embodiments.

A further embodiment is illustrated in FIG. 3E in which a thermal conductor 40, such as a copper plate, is thermally coupled to one side of each of two thermoelectric elements 36A, 36B. The thermal conductor 40 allows heat to flow readily from one thermoelectric element to the other. When the two thermoelectric elements 36A, 36B are energized with opposite polarity, heat will flow from the exterior of the housing 10 adjacent to a first element 36A into the thermal conductor 40, through the thermal conductor 40 to the second element 36B, and then through the second element 36B and out to the exterior of the housing adjacent the second element. By switching the polarity applied to each of the thermoelectric elements 36A, 36B, the cold and hot zones on the communication device 100 can be swapped. A side of the thermal conductor 40 adjacent to interior electronics may be thermally insulated (not shown) to minimize the amount of heat transferred into the communication device 100. In this embodiment, thermoelectric elements can be used to generate hot and cold exterior surfaces without significantly changing the interior temperature of the communication device 100 since heat pumped into one thermoelectric element 36A is immediately pumped out of the communication device by the other thermoelectric element 36B.

Figure 4:
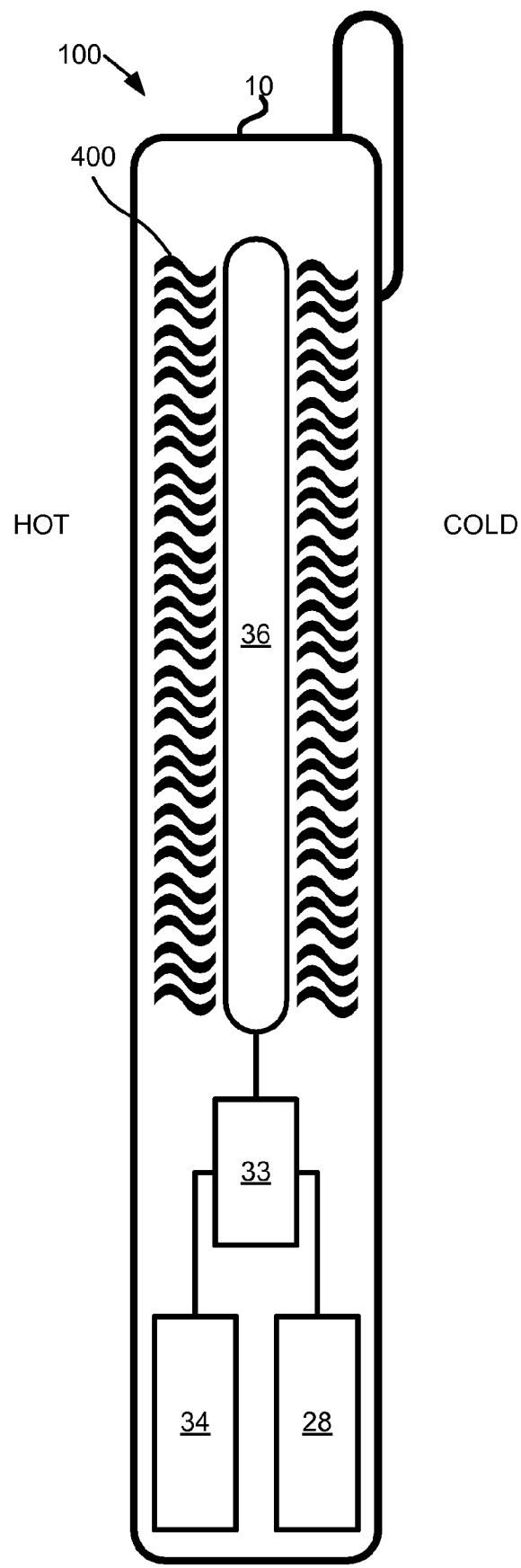
FIG. 4 is a component block diagram of a mobile device with a thermoelectric element according to an embodiment.

In another exemplary embodiment shown in FIG. 4, the thermoelectric element 36 may be arranged within the communication device 100 so that hot and cold temperatures generated on opposite sides of the thermoelectric element 36 can be felt by users on opposite sides of the communication device 100 at the same time. In this embodiment configuration, heat 400 from the exterior of a first side of the communication device 100 housing 10 is caused to flow through the thermoelectric element 36 and out the second side of the housing 10, thereby causing the first side to become colder than ambient while the second side becomes hotter than ambient. In such an arrangement, any change in the device, be it cold or hot depending upon the side adjacent to a user's skin, can convey information to the user, such as that there is an incoming call. This arrangement also helps to prevent heating of the interior of the communication device 100 since the heat pumped through the thermoelectric element 36 to chill one side of the device is conducted out the other side of the housing and not retained inside.

Since thermoception provides another sensory modality by which information may be conveyed to users, temperature changes may be applied to specific components of the communication device 100 to convey information to users in a more meaningful or function-specific fashion. For example, as illustrated in the embodiments shown in FIG. 5A-C temperature changes may be affected in the display, in portions of the display such as a touch screen display, in keypads or in individual keys on the keypad to convey information to users.

Figure 5A:
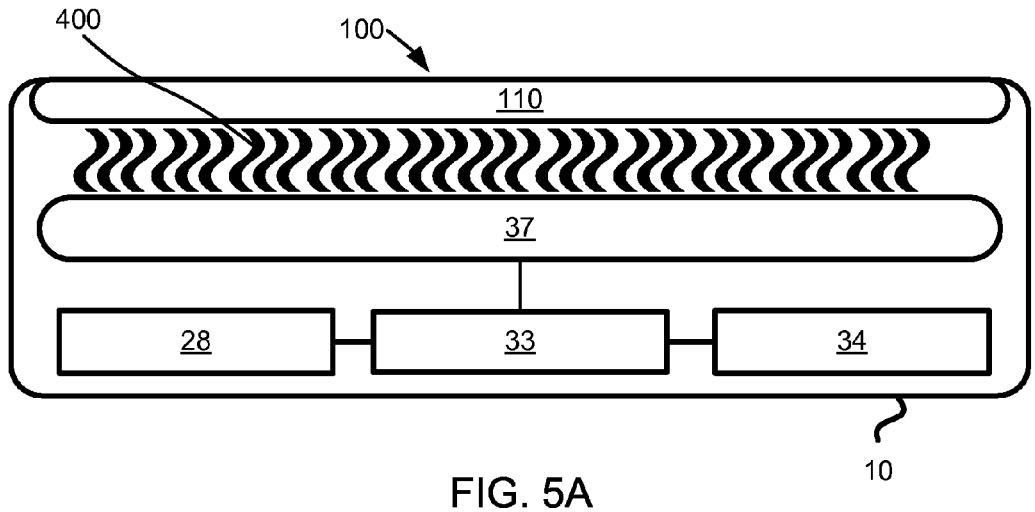
FIG. 5A is a component block diagram of a mobile device with an electric resistance heating element/thermoelectric element coupled to a display according to an embodiment.
Figure 5B:
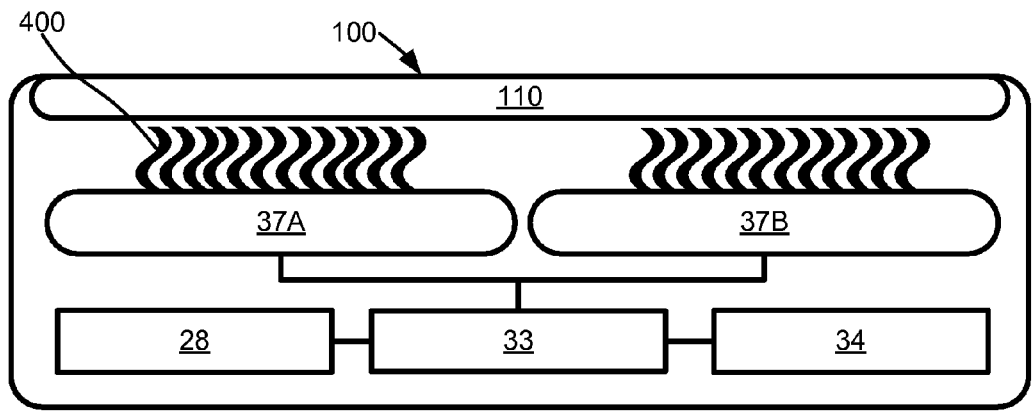
FIG. 5B is a component block diagram of a mobile device with multiple electric resistance heating elements/thermoelectric elements coupled to a display according to an embodiment.

In an embodiment illustrated in FIG. 5A, a communication device 100 includes a display 110 thermally coupled to a thermal modifying element 37, such as an electric resistive heater element 35 or a thermoelectric element 36, which is coupled to a switch 33 configured to provide power to the element from a battery 34 in response to signals received from a processor 28. Heat 400 emitted from the temperature modifying element 37 will change the temperature of the display 110. The temperature modifying element 37 may be configured and positioned so that all or a part of the display 110 changes temperature to convey information about the contents of the display. Further, as illustrated in FIG. 5B, multiple thermal modifying elements 37 may be thermally coupled to the display 110 in different portions to enable heating or cooling the display to convey further information about the aspect appearing on each display portion. For example, when an important e-mail is received, the display 110 may be heated in a portion that is displaying the important e-mail message. This embodiment informs the user of the importance of messages when the display 100 is touched without having to open and read the message contents. For example, important e-mail messages that appear on a touch screen 110 may be hot, those of no importance may be ambient temperature (i.e., no heating or cooling applied) and Spam e-mails which are to be avoided may be cold to the touch, all depending on user settings.

Figure 5C:
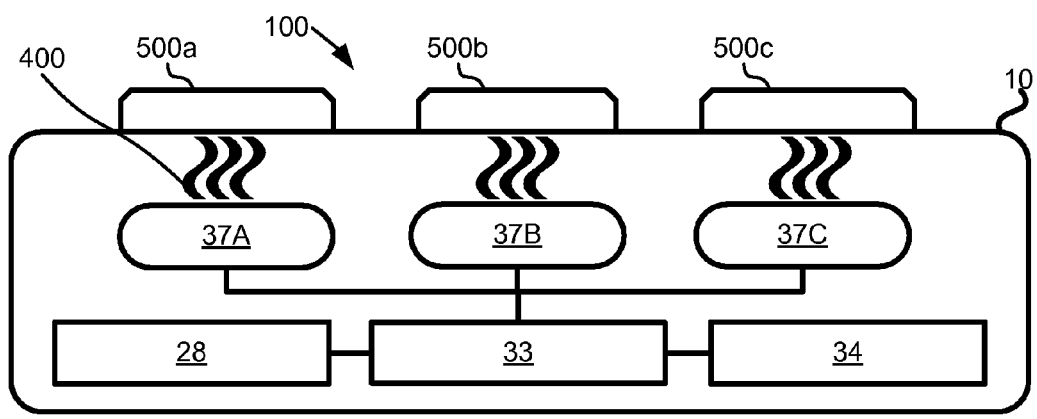
FIG. 5C is a component block diagram of a mobile device with multiple electric resistance heating elements/thermoelectric elements coupled to actuator buttons or keys according to an embodiment.

In an embodiment illustrated in FIG. 5C, a communication device 100 includes keys 500*a*, 500*b*, 500*c* that are thermally coupled to thermal modifying elements 37A, 37B, 37C. Each of the thermal modifying elements 37A, 37B, 37C can be an electric resistive heater element 35 or a thermoelectric element 36 which are coupled to one or more switches 33 configured to provide power to the element from a battery 34 in response to signals received from a processor 28. This embodiment allows the communication device 100 to change the temperature of one or more individual keys 500*a*, 500*b*, 500*c* to provide more context to the information being conveyed by temperature to the user of the communication device 100. For example, the communication device 100 may be a game controller for which each button 500*a*, 500*b*, 500*c* controls a different game function, so that changing the temperature of each button may convey information related to a game state of the associated function.

Communication devices 100 may be configured to allow users to set priority rules by which the processor 28 can determine when temperature signals should be employed. For example, users may prioritize their contacts in an address book which can be used to prioritize incoming calls, e-mails and SMS messages. Similarly, users may prioritize the events stored in their electronic calendars according to their importance. For example, a user may designate Contact A as important and configure the user's communication device 100 with a temperature rule to signal an incoming call by generating heat. When an incoming call is received from Contact A, the processor 28, configured by software, may determine the phone number of the caller from the received caller ID information, use the number to look up the corresponding contact in the address book database to identify the caller as Contact A, determine based upon a priority stored in the database contact record that Contact A is an important person, and apply the important person temperature rule to energize an electrical resistance heater element 35 to cause the phone to heat up, thereby alerting the user of an important call. In an embodiment, users may configure their address book contract records to designate specific types of temperature changes (e.g., no change, hot, cold, hot/cold, etc.) for each stored contact.

In a similar manner, the communication device 100 can be configured to communication information regarding an incoming e-mail message. The communication device 100 processor 28 may be configured by software to determine whether the sender of the e-mail message is designated by the user as an important contact in the address book and generate a temperature signal based on the sender's importance parameter. In this embodiment, the processor 28, configured by software, may determine the sender's e-mail address from the received e-mail, use the sender's address to look up the contact record in the address book database to identify the sender as Contact A, determine from the database contact record that Contact A is an important person, and apply the important person temperature rule to energize an electrical resistance heater element 35 to cause the phone to heat up, thereby alerting the user of an important e-mail. Another priority parameter may be the priority designation applied to the e-mail by the sender. For example, a sender may designate an e-mail as important. Using temperature rules, a user may program the communication device 100 to recognize such priority labeling by the sender and alert the user about the receipt of such e-mails by changing temperature. In this embodiment, the processor 28, configured by software, may check the importance flag on the received e-mail to determine the sender's priority setting, and apply the e-mail importance temperature rule to energize an electrical resistance heater element 35 to cause the phone to heat up, thereby alerting the user of an e-mail designated as being important.

FIG. 6 illustrates an example embodiment data structure 600 which may be implemented in a communication device 100 to store a user's importance designations for contacts in an address book database. For example, users may prioritize each contact in their address book and store for each contact Name 600*a*: a designated Priority 600*b* of the contact; the Temperature 600*c* to use to signal that the contact is communicating with the user; a Ring Style 600*d* accompanying the temperature change; a Mode 600*e* indicating the status of the user; and a Communication Type 600*f* indicating the type of communication that is being prioritized. Using such a temperature rule data structure, a processor 28 that has determined that an incoming communication is coming from a particular contact name can look up the appropriate temperature signal that should be applied under the circumstances of the user's mode settings and the incoming communication type.

For example, John Doe, row 604, may be prioritized by the user as an important contact. The user may further require that when a phone call is received from John Doe while the user is in a meeting, the temperature of the communication device should increase without sounding a ring tone or vibrating. Alternatively, as shown in row 606, Jane Doe may be designated as a contact with an unimportant priority for which the user wants the communication device 100 to remain silent and not change temperature when the user receives an SMS message from Jane Doe during a meeting. This ensures that the user is not distracted by unimportant communications while attending a meeting. Rows 606, 608 and 610 also illustrate other possible temperature rules that users may set for other contacts in their address books.

As illustrated in FIG. 7, a similar data structure 700 may be used for communication devices 100 equipped with thermoelectric elements 36 that can generate hot or cold surfaces. For such communication devices, users may prioritize each contact stored in their address book database to signal hot, cold or ambient (i.e., neither hot or cold). Thus, for each contact Name 700*a* the user can designate: a Priority 700*b*; a Temperature 700*c* signal to use when the contact communicates with the user; a Ring Style 700*d* accompanying the temperature change; the device operating Mode 700*e* in which the temperature signal should be generated; and a Communication Type 700*f* indicating the type of communication that is being prioritized.

By way of example, John Doe, row 702, may be prioritized by a user as an important contact. The user can also set temperature rules such that upon receipt of a phone call from John Doe during a meeting, the communication device 100 will turn hot and remain silent. As a further example, the user may prioritize his mother-in-law, Jane Doe, row 704, as a contact to be avoided. The user can further set temperature rules such that the communication device 100 will turn cold and remain silent when an SMS message is received from Jane Doe during a meeting. Rows 706, 708, 710, 712 and 714 illustrate other possible temperature rules that users may set for other contacts in their address books.

It will be appreciated by one of skill in the art that the designation of contact priority 600*b*, 700*b* may be stored within a data field for each contact within an address book database separate from the temperature rules 600*c*, 700*c* which may be stored in a separate data file. In this alternative data structure, the temperature 600*c*, 700*c* may be designated for each combination of contact priority 600*b*, 700*c* (obtained from the address book record), operating mode 600*e*, 700*e* (obtained from the operating system state settings) and incoming communication type 600*f*, 700*f*. This alternative data structure may be in the form of a table very similar to that shown in FIGS. 6 and 7 excluding the Name data column.

The data structures discussed above with reference to FIGS. 6 and 7 may be stored in memory of the communication device 100 so they can be accessed by the communication device processor 28.

Figure 8:
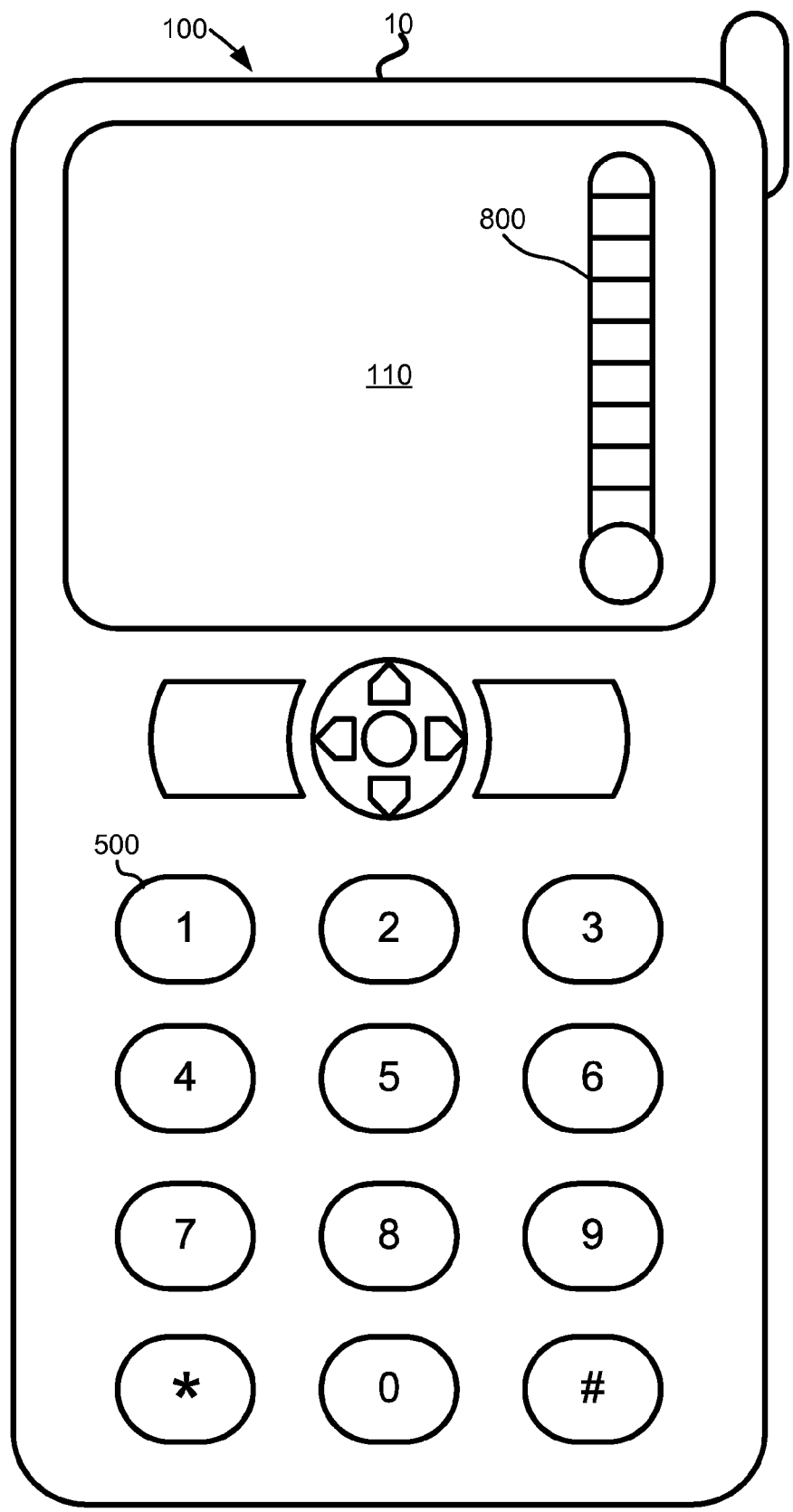
FIG. 8 is a front view of a communication device including a visual display according to an embodiment.

In an embodiment illustrated in FIG. 8 communication devices 100 may communicate with users via their sense of temperature in combination with other senses. Using more senses to communicate information to the user may increase communication effectiveness and accuracy. This may be done, for example, by combining the use of visual images presented on the display with temperature changes perceivable on the device housing 10 or display.

In the exemplary embodiment illustrated in FIG. 8, when an important phone call turns a mobile device hot, a virtual thermometer 800 may be presented on the display 110 while the communication device 100 generates heat to simultaneously communicate visually and thermally the degree of importance of the phone call. In another example, to convey information about the outside temperature, temperature information may be conveyed to users by heating or cooling the housing 10 of a communication device 100, or by changing the temperature of a part of the mobile device, such as the display 110, or keys 500. While the temperature of the mobile device informs the users about the outside temperature in general terms (i.e., warm or cool) in a manner which doesn't require looking at the device, a virtual thermometer 800 may also be shown on the display 110 to more precisely indicate the outside temperature. The information about the outside temperature may be conveyed to the users upon request or intermittently and automatically.

Once users have configured their communication devices 100 by creating priority rules such as discussed above with reference to FIGS. 6 and 7, the communication devices 100 can inform users about incoming communications and received data by changing its surface temperature.

Figure 9:
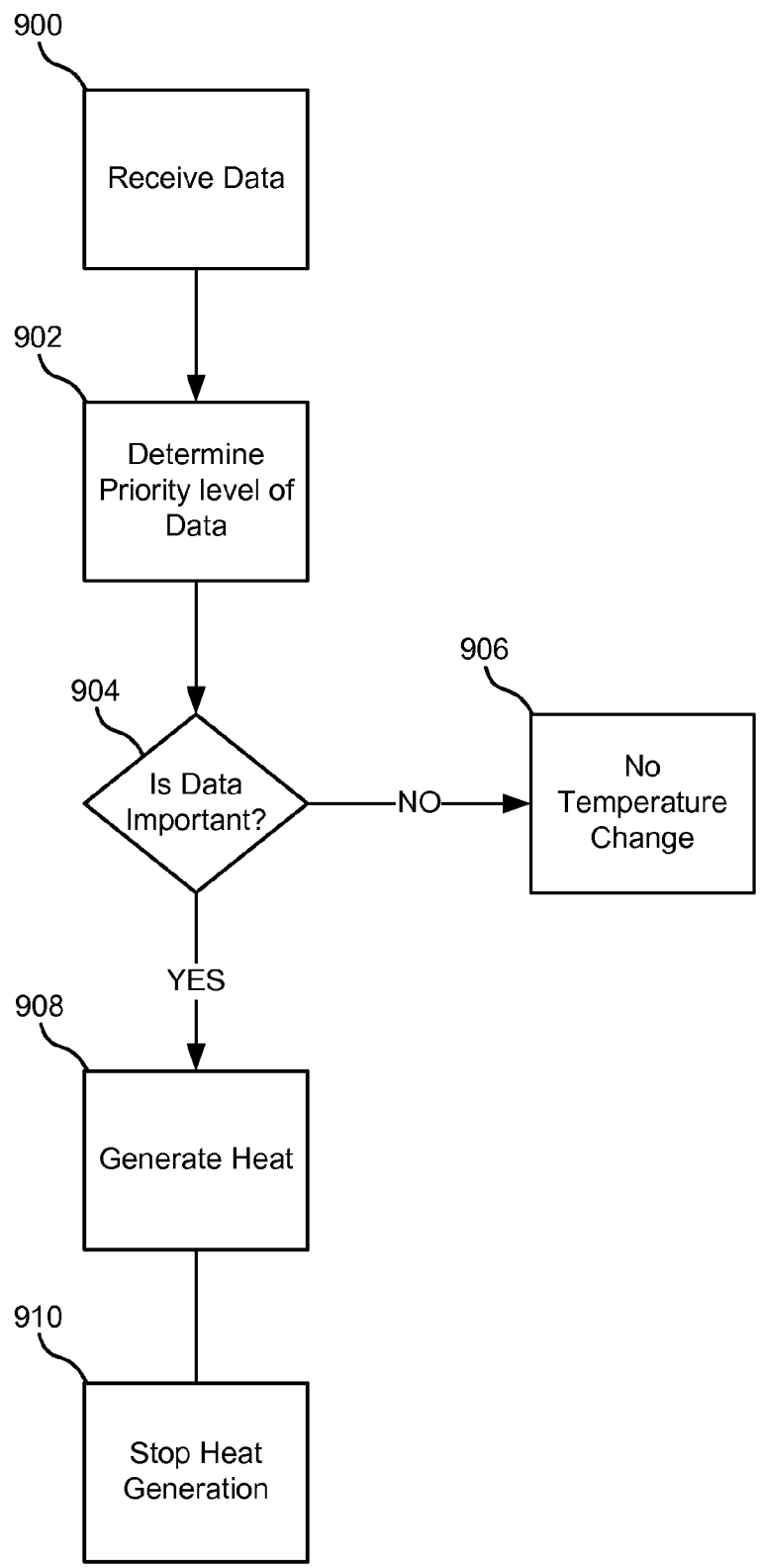
FIG. 9 is a process flow diagram of an embodiment method suitable for communicating information using heat generation.

The process flow diagram shown in FIG. 9 illustrates example steps that may be implemented to alert users about the priority of received data using a communication device 100 equipped with an electric resistance heating element 35. When data is received, step 900, a communication device 100 processor 28 configured by software may determine the priority level of the received data based on priority instructions or temperature rules set by the user and stored in memory, step 902. To determine the priority of the received data, the processor 28 may read a priority indicator from within the data or use the data to look up an appropriate temperature rule within a temperature rule database. If the processor 28 determines that the received data is not important (i.e., test 904="NO"), the processor 28 may not activate the electric resistance heating element 35 so the communication device's temperature remains unchanged, step 906. If the processor 28 determines that the received data is important (i.e., test 904="YES"), the processor 28 sends a signal to the switch 33 to activate the electric resistance heating element 35 by connecting it to the battery 34 which causes the heating element 35 to generate heat, step 908. To conserve power, after a period of time, such as 30 seconds, the processor 28 may send a signal to the switch 33 causing it to disconnect the heating element 35 from the battery 34, thereby terminating heat generation, step 910. The duration that a communication device 100 may generate heat may be set in advance or adjusted by the user.

Figure 10:
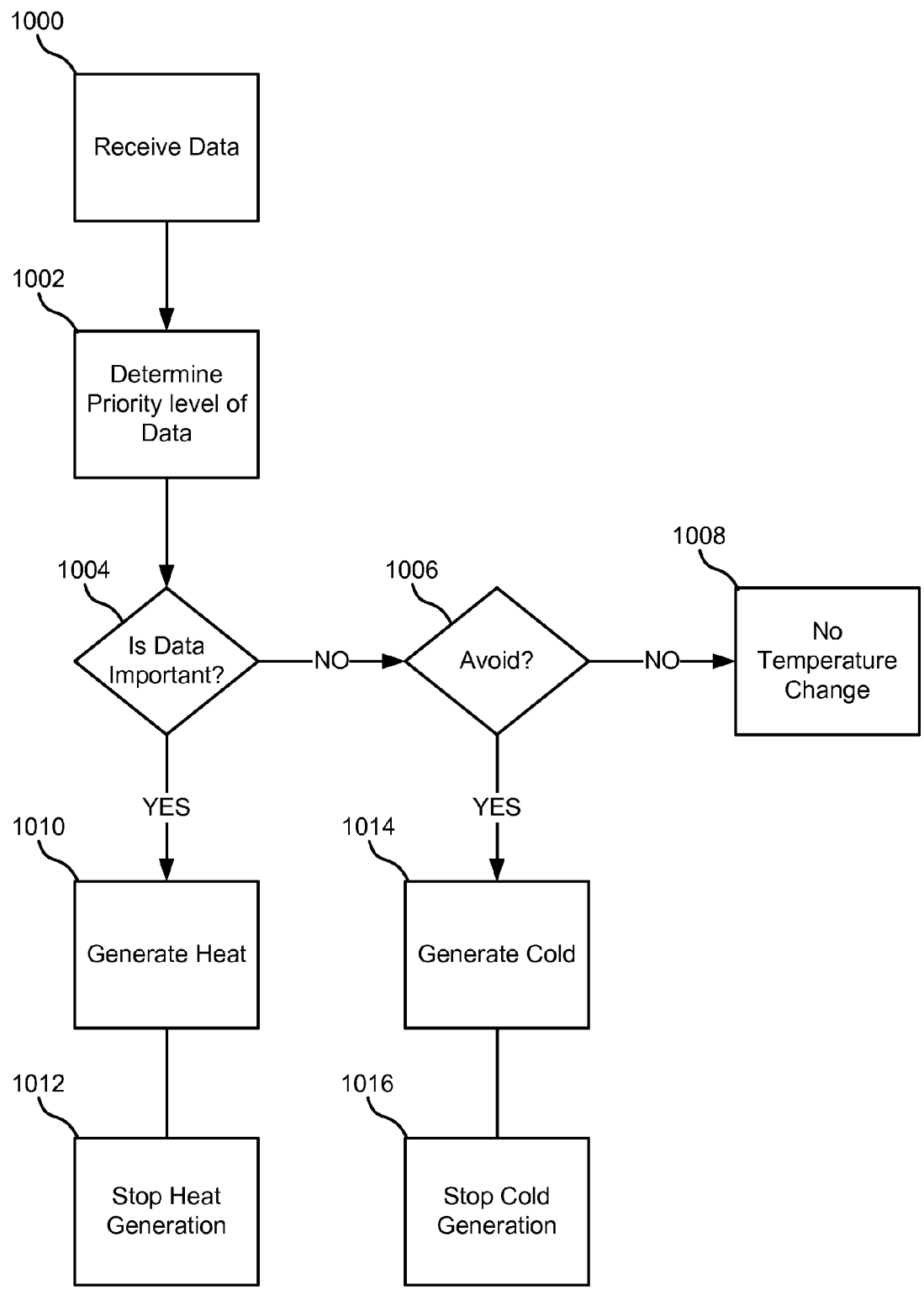
FIG. 10 is a process flow diagram of an embodiment method suitable for communicating information using either heat generation or forced heat conduction.

The process flow diagram shown in FIG. 10 illustrates example steps that may be implemented to alert users about the priority of received data on communication devices 100 equipped with a thermoelectric element 36. Data received by the communication device 100, step 1000, may be analyzed by the processor 28 to determine its priority, step 1002. As discussed above with reference to FIGS. 6, 7 and 9, a user may store priority instructions or temperature rules in memory of the communication device 100 that the processor 28 can use to determine whether received data is important and to determine whether to generate hot or cold surfaces accordingly. The processor 28 may be configured by software to compare the received data to user priority instructions or temperature rules and determine the priority level of the received data based on the priority criteria set by the user, step 1002. If the processor 28 determines that the received data is important (i.e., test 1004="YES"), the processor 28 may send a signal to the switch 33 causing it to connect the thermoelectric element 36 to the battery 34 with the appropriate polarity to generate heat, step 1010. To conserve power, after a period of time determined by user settings, such as 30 seconds for example, the processor 28 may send a signal to the switch 33 causing it to disconnect the thermoelectric element 36 from the battery 34, thereby terminating heat generation, step 1012. If the processor 28 determines that the received data is not important (i.e., test 1004="NO"), the processor 28 may determine whether the data is of low importance or is information the user prefers to avoid, test 1006. If the processor 28 determines that the data is not of a type which the user prefers to avoid (i.e., test 1006="NO"), the processor 28 may store the data without changing the temperature, step 1008. If the processor 28 determines that the data is of low importance or is information of a type which the user prefers to avoid (i.e., test 1006="YES"), the processor 28 may send a signal to the switch 33 causing it to connect the thermoelectric element 36 to the battery 34 with the appropriate polarity to chill a surface of the communication device, step 1014. To conserve power, after a period of time determined by user settings, such as 30 seconds, the processor 28 may send a signal to the switch 33 causing it to disconnect the thermoelectric element 36 from the battery 34 thereby terminating the chilling, step 1016.

Figure 11:
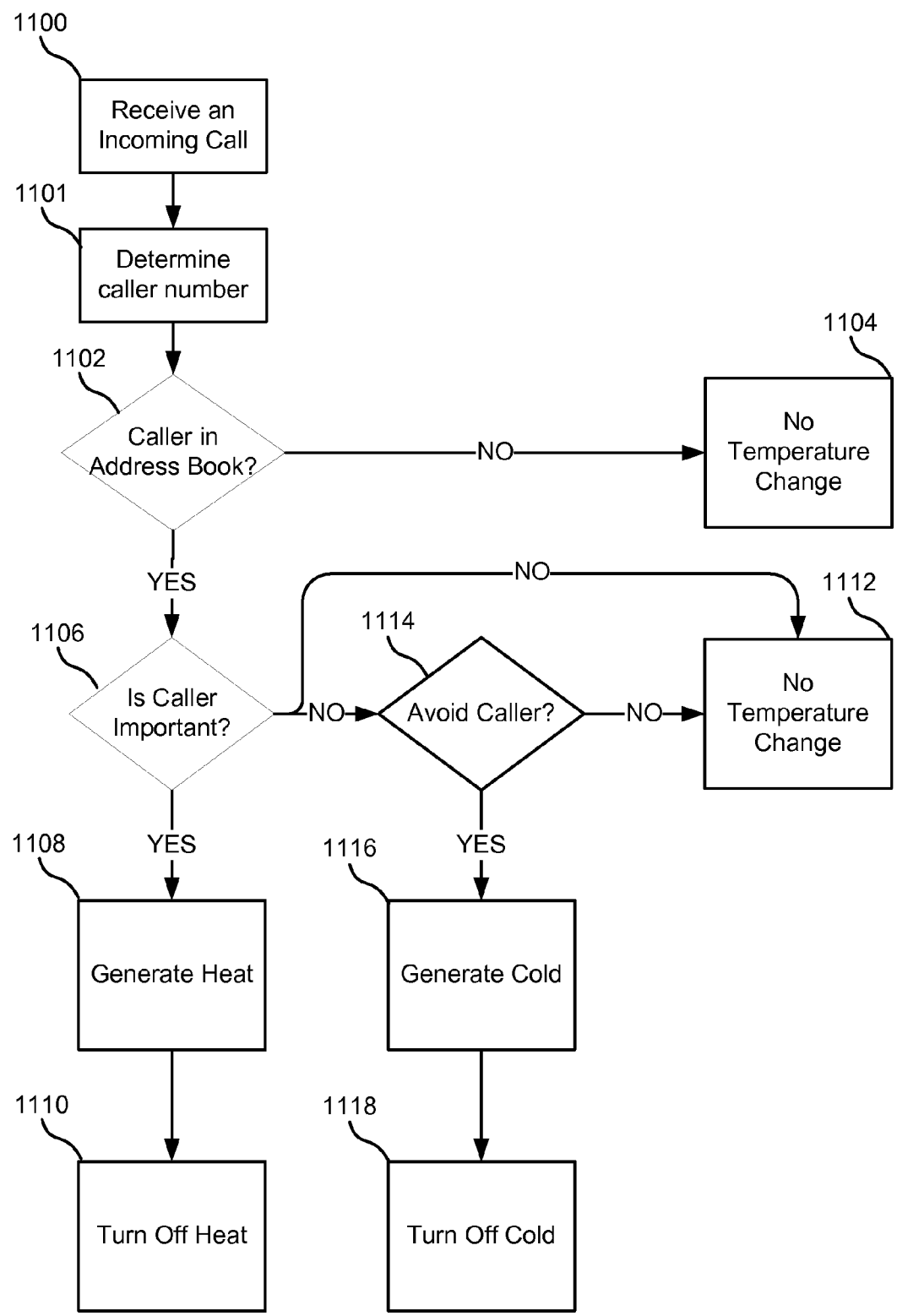
FIG. 11 is a process flow diagram of an embodiment method suitable for communicating information using temperature regarding on an incoming call.

In another example embodiment in which the communication device 100 is a cellular phone users may designate persons listed in their address book as being important. Such designations may be used to by the cellular phone processor 28 to determine whether to activate an electrical resistance heater element 35 (or thermoelectric element 36) to generate heat to alert the user of an incoming call from a designated important person. The process flow diagram shown in FIG. 11 illustrates exemplary steps that may be implemented when users prioritize the contacts in their address book to enable the communication device 100 to change temperature to inform users about important incoming calls. As described above, users may assign priority rules so that upon receiving calls from important contacts the communication device 100 heats up, for example, and upon receiving calls from contacts who are to be avoided the communicating 100 device including a thermoelectric element 36 cools down, for example. When an incoming phone call is recognized by the communication device 100, step 1100, the communication device 100 processor 28 determines the caller's number from the caller identification information included in the wireless transmission received from the cellular network, step 1101. Methods for obtaining caller telephone numbers from incoming calls are well known in the art. Using the received telephone number, the processor 28 queries the address book database stored in memory to determine whether there is a match which indicates that the caller is included in the address book, test 1102. If the caller is not listed in the address book (i.e., test 1102="NO"), the communication device 100 may not make any temperature changes to alert the user about the phone call, step 1104. If the caller is listed in the address book (i.e., test 1102="YES"), the communication device 100 processor 28 checks the priority setting stored in the contact record in the address book database to determine whether the caller is prioritized as an important caller, test 1106. If the processor 28 determines that the caller is designated important by the user (i.e., test 1106="YES"), the communication device 100 processor 28 sends an appropriate signal to the switch 33 causing it to connect the temperature modifying element 37 to the battery 34 to generate heat to alert the user of an important call. If the cellular telephone uses a thermoelectric element 36 for generating heat, the switch 33 applies battery power to the thermoelectric element 36 with the proper polarity to flow heat to the communication device 100 exterior. After a period of time, which may be based on user settings, the processor 28 signals the switch 33 to disconnect battery power from the temperature modifying element 37 thereby turning off heat generation, step 1110. In communication devices 100 equipped with electric resistance heating elements 35, if the processor 28 determines that the caller is not designated as important by the user (i.e., test 1106="NO"), the processor 28 does not activate the switch 33 and no change in temperature occurs, step 1112. However, in communication devices 100 equipped with thermoelectric elements 36, if the processor 28 determines that the caller is not designated important by the user (i.e., test 1106="NO"), the communication device 100 processor 28 further determines from user priority settings stored in the address book whether the caller is to be avoided, test 1114. If the caller is not to be avoided (i.e., test 1114="NO"), the processor 28 does not activate the switch 33 and no change in temperature of the communication device 100 will occur, step 1112. If the processor 28 determines that the caller is to be avoided (i.e., test 1114="YES"), however, the processor 28 sends an appropriate signal to the switch 33 causing it to connect the thermoelectric element 36 to the battery 34 with the appropriate polarity to generate cold on the exterior of the communication device 100, step 1116. After a period of time, which may be based on user settings, the processor 28 signals the switch 33 to disconnect battery power from the thermoelectric element 36 thereby turning off cold generation, step 1118.

In a similar manner, a communication device 100 may be programmed to change temperature to notify the user of an incoming e-mail message. Depending on the type of temperature modifying element that the communication device 100 includes, it may generate heat, cold or both heat and cold. For example, the communication device 100 may generate heat to signify important messages and chill the exterior of the device to signify messages from someone the user would like to avoid. No change in temperature may occur if the user does not prioritize contacts or the e-mail is received from a contact with no special prioritization.

The user can elect to set priority rules to prioritize e-mail messages based on different criteria. For example, the user can program the communication device 100 to prioritize e-mail messages based on the sender, the other recipients, the e-mail message priority label designated by the sender, or a combination of these variables. In one implementation, the temperature communication may be initiated based on an assessment of one criterion, such as the sender's e-mail address or identity. In another implementation, users may optionally configure the communication device 100 to initiate temperature communication based on a stored priority setting for another recipient of the e-mail. For example, if the sender is designated in the user's address book as a contact to be avoided but another recipient of the e-mail is designated in the user's address book as an important contact, the processor 28 may be configured to initiate a temperature communication (e.g. generating heat) because the message is being sent to an important contact even though the sender is designated as a contact to be avoided. In a further implementation, if the sender is not included in the user's address book database, the processor 28 may determine whether any other recipients are included in the address book and, if so, initiate a temperature communication based upon the importance priority assigned to the recipients. In a further implementation, the processor 28 may initiate a temperature communication based upon the priority designated for the message by the sender.

Figure 12A:
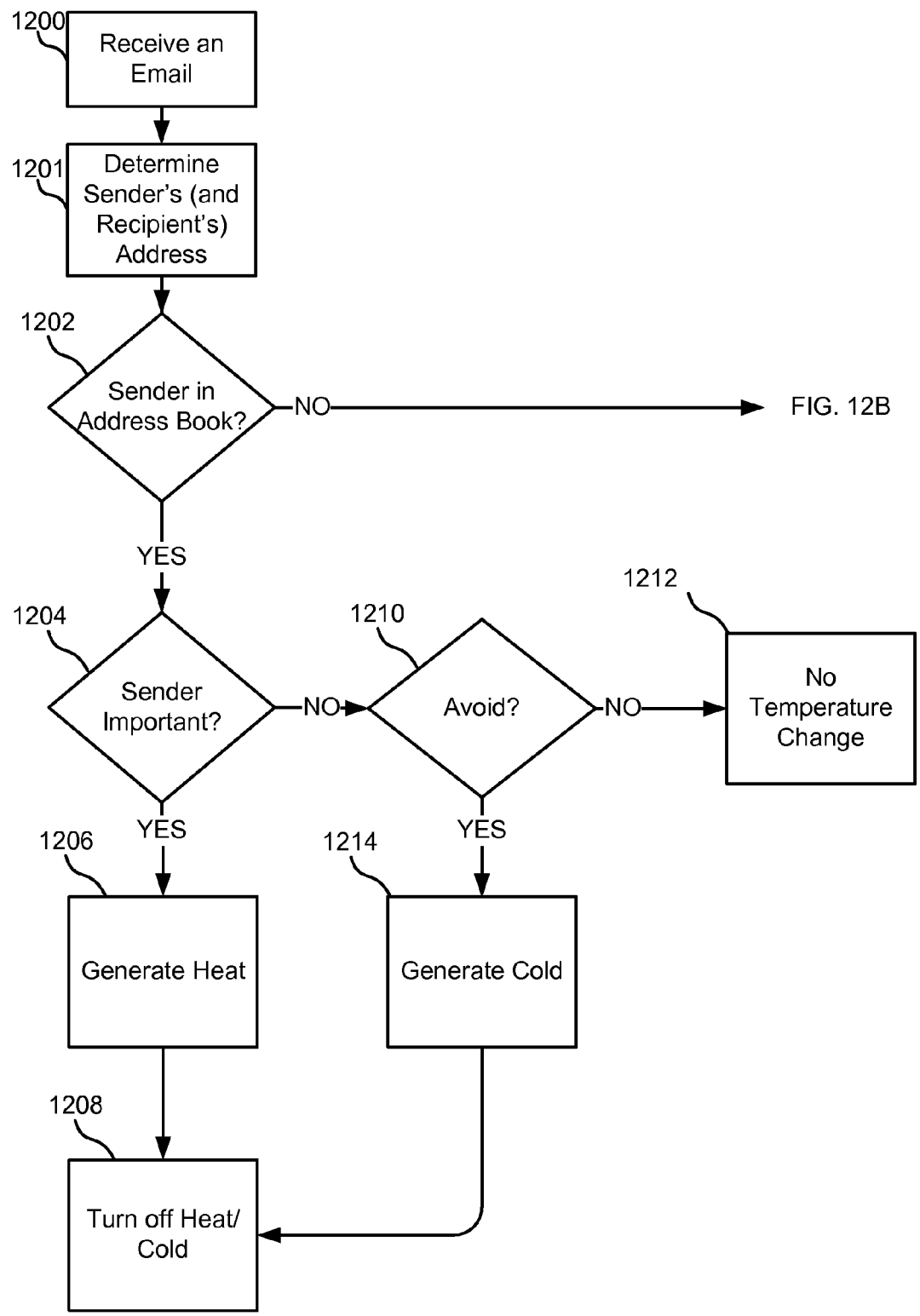
FIGS. 12A-12C is a process flow diagram of an embodiment method suitable for communicating information using temperature regarding an incoming E-mail.
Figure 12B:
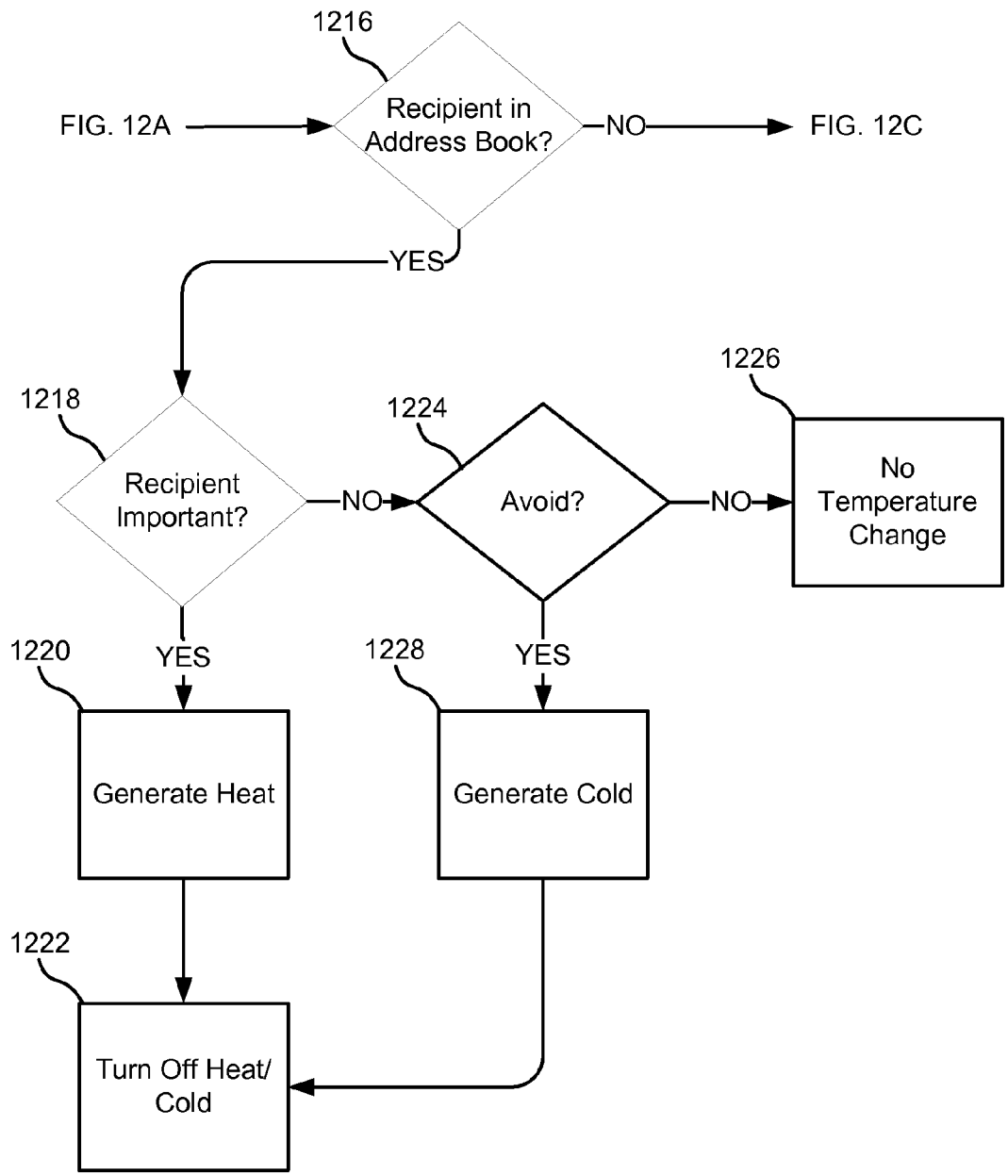
Figure 12C:
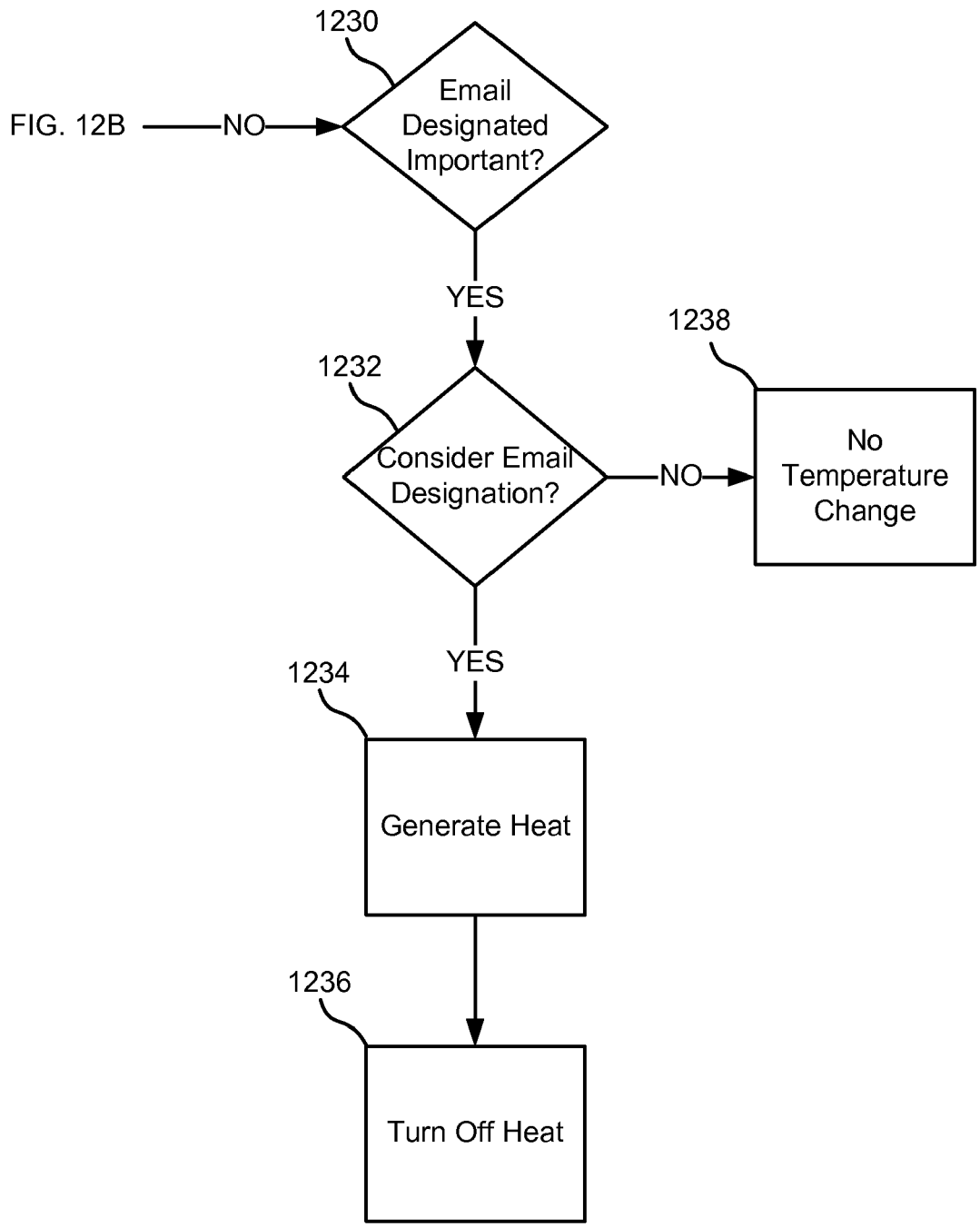

The process flow diagram shown in FIGS. 12A-12C illustrates example steps that may be implemented upon receipt of an e-mail message by a communication device 100 equipped with a thermoelectric element 36 configured so the device can alternatively generate heat or cold. In the illustrated example, the processor 28 determines whether to initiate a temperature communication based on the contact priority setting stored in the address book database, and if the sender is not in the user's address book database, the processor 28 looks to priority settings stored in the address book database for other recipients (if any) or to the priority assigned to the message by the sender. It should be appreciated that slightly different process flows will be used in the alternative implementations described above, such as to initiate temperature communication based on other recipient priority or the priority assigned to the message by the sender even when the sender is a contact included in the address book database.

When an e-mail message is received, step 1200, the processor 28 inspects the message header to determine the sender's e-mail address and, optionally, the e-mail addresses of other recipients, step 1201. Using the received e-mail address (es), the processor 28 determines whether the sender is listed in the address book database, test 1202. If the processor 28 determines that the sender is included in the address book database (i.e., test 1202="YES"), the communication device 100 processor 28 checks the priority setting for that contact stored in the address book database to determine whether the sender is prioritized as an important contact, test 1204. If the processor 28 determines that the sender is an important contact (i.e., test 1204="YES"), the processor 28 may send a signal to the switch 33 causing it to apply power from the battery 34 to the thermoelectric element 36 with the appropriate polarity to generate heat on the exterior of the communication device 100, step 1206. After a period of time, which may be based on user settings, the processor 28 signals the switch 33 to disconnect battery power from the thermoelectric element 36, thereby turning off heat generation, step 1208. If the sender is not prioritized as an important contact (i.e., test 1204="NO"), the communication device 100 processor 28 may determine whether the contact is prioritized in the address book database as one to be avoided, test 1210. If the processor 28 determines that the contact is to be avoided (i.e., test 1210="YES"), the processor 28 may send a signal to the switch 33 causing it to apply power from the battery 34 to the thermoelectric element 36 with the appropriate polarity to chill the exterior of the communication device 100, step 1214. After a period of time, which may be based on user settings, the processor 28 signals the switch 33 to disconnect battery power from the thermoelectric element 36, thereby turning off the chilling effect, step 1208. If the contact is not to be avoided (i.e., test 1210="NO"), the processor 28 may not send a signal to the switch 33 and as a result no change in temperature of the communication device 100 may occur, step 1212.

FIG. 12B continues the process flow diagram for the case where the sender of the received e-mail is not in the address book database (i.e., test 1202="NO"). In that case the communication device 100 processor 28 compares the e-mail addresses for other recipients of the e-mail (if any) obtained in step 1201 to e-mail addresses stored in the user's address book database to determine whether any of the recipients are stored in the address book, test 1216. If the processor 28 finds a match between one or more of the other recipient e-mail addresses and addresses stored in the address book database (i.e., test 1216="YES"), the processor 28 queries the matching contact entries in the database to determine if any of them are prioritized as an important contact, test 1218. If the processor 28 determines that one or more of the other recipients is designated important by the user based upon settings stored in the address book database (i.e., test 1218="YES"), the processor 28 may send a signal to the switch 33 causing it to apply power from the battery 34 to the thermoelectric element 36 with the appropriate polarity to generate heat on the exterior of the communication device 100, step 1220. After a period of time, which may be based on user settings, the processor 28 signals the switch 33 to disconnect battery power from the thermoelectric element 36, thereby turning off heat generation, step 1222. However, if the processor 28 determines that none of the other recipients are designated as important in the address book database (i.e., test 1218="NO"), the communication device 100 processor 28 may determine whether the contact is prioritized in the address book as one to be avoided, test 1224. If the processor 28 determines that the contact is to be avoided (i.e., test 1210="YES"), the processor 28 may send a signal to the switch 33 causing it to apply power from the battery 34 to the thermoelectric element 36 with the appropriate polarity to chill the exterior of the communication device 100, step 1228. After a period of time, which may be based on user settings, the processor 28 signals the switch 33 to disconnect battery power from the thermoelectric element 36 thereby turning off the chilling effect, step 1222.

FIG. 12C continues the process flow diagram for the case where the processor 28 determines that none of the other recipients (if any) of the received e-mail are in the address book (i.e., test 1216="NO"). In that event the communication device 100 processor 28 may inspect the e-mail content to determine whether the sender designated the e-mail as important, test 1230. If the processor 28 determines that the e-mail was designated as important by the sender (i.e., test 1230="YES"), the communication device 100 processor 28 determines whether such designation should be taken into consideration based on user settings, test 1232. If the user has configured the communication device 100 with user setting such that e-mail designations by senders should be considered in determining whether to implement temperature communication (i.e., test 1232="YES"), the processor 28 may send a signal to the switch 33 causing it to apply power from the battery 34 to the thermoelectric element 36 with the appropriate polarity to generate heat on the exterior of the communication device 100, step 1234. After a period of time, which may be based on user settings, the processor 28 signals the switch 33 to disconnect battery power from the thermoelectric element 36 thereby turning off heat generation, step 1236. However, if the processor 28 determines that the user settings do not require temperature changes in response to e-mail designations by senders (i.e., test 1232="NO"), the processor 28 may not send a signal to the switch 33 and as a result no change in temperature will occur, step 1238.

Process steps similar to those described above with reference to FIGS. 12A-12C may be implemented when an SMS message is received by a communication device 100. SMS messages contain the sender's telephone number which the processor 28 can use to determine whether the sender is a contact stored in the user's address book database (similar to test 1202), and if so, determine whether the sender is designated as an important contact (similar to test 1204), and if so, send signals to the switch 33 to activate the thermoelectric element 36 to generate heat, step 1206, and deactivate the element after a period of time, step 1208. If the processor 28 determines that the SMS message sender is designated in the user's address book database as a contact to be avoided (similar to test 1210), the processor 28 may send signals to the switch 33 to activate the thermoelectric element 36 to chill the exterior of the communication device 100 and then deactivate the element after a period of time, step 1208. If the processor 28 determines that the sender of the SMS message is not included in the user's address book database (i.e., test 1202="NO"), the processor 28 may inspect the SMS message to determine if the sender marked it as important (similar to test 1230), and if so, determine if SMS message importance designations should be considered in activating a temperature communication (similar to test 1232). If the SMS message is designated as important by the sender and the user has elected to be informed of SMS message importance designations by temperature communication, the processor 28 may signal the switch 33 to apply battery power to the thermoelectric element 36 so as to generate heat, step 1234, and then after a period of time signal the switch 33 to remove battery power from the thermoelectric element 36 so as to terminate heat generation, step 1236.

Figure 13:
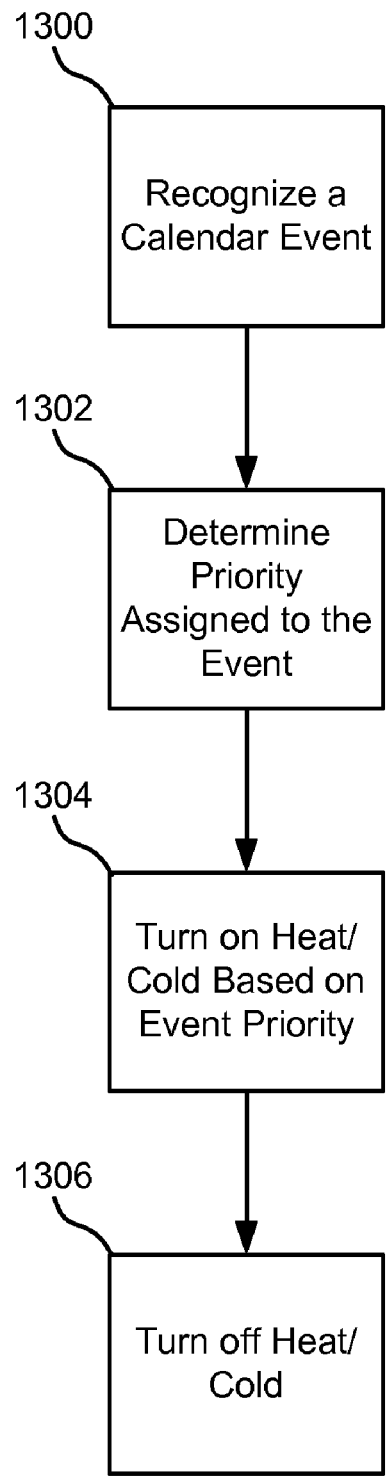
FIG. 13 is a process flow diagram of an embodiment method suitable for communicating information using temperature regarding a calendar event.

The process flow diagram shown in FIG. 13 illustrates example steps that may be implemented in a communication device 100 equipped with a thermoelectric element to alert the user about calendar events. Users may configure their communication devices 100 via user settings to notify them about designated calendar events by changing temperature (i.e. turning hot or cold). The user's election to communicate an impending calendar event by a temperature change may be recorded within the event data record itself and/or may be implemented in a user setting regarding how the communication device 100 should notify the user of all calendar events. For example, in a calendar application a calendar event may include a data field for storing whether the user wishes to be notified of the particular event using a temperature change, and if so, whether the temperature change should be heating or cooling. As another example, user settings for ring tones and operating modes (e.g., normal, quiet, meeting, etc.) may include a setting indicating whether temperature changes should be included in calendar event notifications. In such event notifications, the user setting may be fully selectable, such as to generate heat when an event (e.g., a meeting) that is designated as important is about to occur, with the heat increasing as the time of the event draws closer. When a calendar event is recognized by the communication device 100 processor 28, step 1300, the processor determines the priority assigned to the event, step 1302. Depending on the assigned priority, the processor 28 may signal the switch 33 to provide battery power to the temperature modifying element 37 to cause it to heat or chill the communication device, step 1304. As just mentioned, the processor 28 may look to the calendar event record itself to determine if a temperature change should be implemented, or may use the priority assigned to the event and the currently implement user operating mode settings to determine if the event is of a type for which the user wants to receive a temperature communication. For example, the user may configure the communication device 100 user settings to generate heat 15 minutes before an important scheduled phone call as a reminder that an important event is about to begin. As another example, the user may configure the communication device 100 user settings to chill the device 20 minutes before a scheduled meeting. After a period of time, which may be based on user settings, the processor 28 may signal the switch 33 to disconnect battery power from the temperature modifying element 37, thereby turning off heating or chilling, step 1306.

In another exemplary embodiment, outside temperature information may be communicated to users through communication devices 100. Such communication devices 100 may be fashioned as an ornamental object or an electronic device. For example, an alarm clock may be equipped with a temperature modifying element 37, such as a thermoelectric element 37 powered via a switch 33 controlled by a processor 28 which is configured to receive temperature information via a transceiver 38. Such communication devices 100 may be battery 34 powered or powered by a power supply (not shown) connected to ordinary household current (e.g., 60 cycle, 118 volt power). Such an alarm clock may receive outside temperature information via the transceiver 38 from an outside thermometer (such as a temperature sensor coupled to a wireless data transmitter) or from a wireless data network (such as from a local weather reporting Internet website accessed via a wireless data network). The processor 28 may be configured by software to energize the thermoelectric element 36 to warm or chill at least a portion of the exterior of the alarm clock as appropriate to inform the user about the outside temperature. The alarm clock processor 28 may be configured to periodically receive information about the outside temperature and adjust its surface temperature accordingly. Alternatively, the temperature of the alarm clock surface may be changed only when the user is likely to touch it, such as when the alarm is sounded, in which case the snooze button may be either chilled or heated according to the outside temperature. In this manner when a user silences the alarm clock, he/she will be informed about the outside temperature through temperature perception without having to look at the clock, watch the morning news or check an outside thermometer. The alarm clock may also include a thermometer display by which the exact outside temperature may be conveyed to the users via the users' visual sense. This embodiment may be implemented in any form, including a sculpture, a portion of furniture, or a portion of a structure so that a user can be informed about the outside temperature merely by touching the temperature-changing part or portion.

Figure 14:
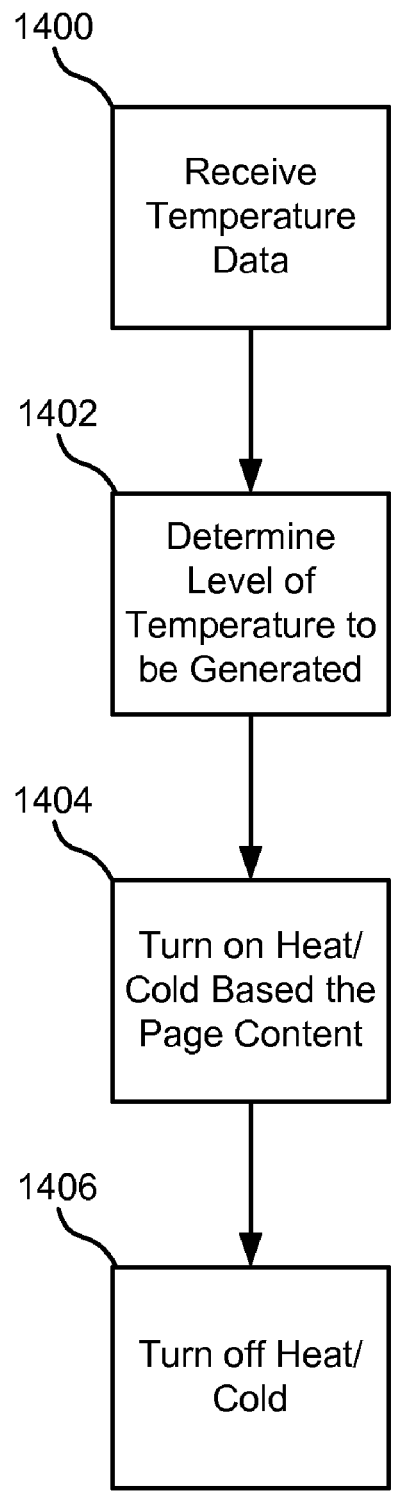
FIG. 14 is a process flow diagram of an embodiment method suitable for communicating information related to received temperature data.

The process flow diagram shown in FIG. 14 illustrates example steps that may be implemented to convey temperature information to a user using a device temperature change. A communication device 100 processor 28 may be configured to receive temperature information, step 1400, such as via a transceiver 38. Such information may include or relate to the outside temperature, the inside temperature or the temperature of another device, location or geographic region. Upon receiving the temperature information, the processor 28 may interpret the received data to determine a temperature that should be exhibited on an exterior surface, step 1402. For example, the communication device 100 processor 28 may be configured by software to send signals to a switch 33 to apply power to a thermocouple element 36 to cause it to generate heat when the received temperature is above about 70° F. and to chill the exterior of the device when the received temperature is below about 60° F. Alternatively, the processor 28 may be configured by software to send signals to the switch 33 so as to control the surface temperature of the communication device 100 to within a range of degrees commensurate with the outside temperature or even to accurately reflect the outside temperature. For example, the processor 28 may be programmed to cycle the switch 33 so as to produce a device exterior surface temperature that is one of hot, warm, ambient (i.e., no temperature change), cool or cold. In such an implementation, for example, when the outside temperature is above 85° F., the processor 28 may cause the communication device 100 to become hot; when the outside temperature is between 75° F. and 84° F. the processor 28 may cause the communication device 100 to become warm; when the outside temperature is between 55° F. and 64° F. the processor 28 may cause the communication device 100 to become cool; and when the outside temperature is below 54° F. the processor 28 may cause the communication device to become cold. In some implementations, particularly those that are battery powered, after a period of time which may be based on user settings and depend upon other events (e.g., time since the device was last touched), the processor 28 may signal the switch 33 to disconnect power from the thermoelectric element 36, thereby allowing the communication device 100 to return to ambient temperature, step 1406.

Figure 15:
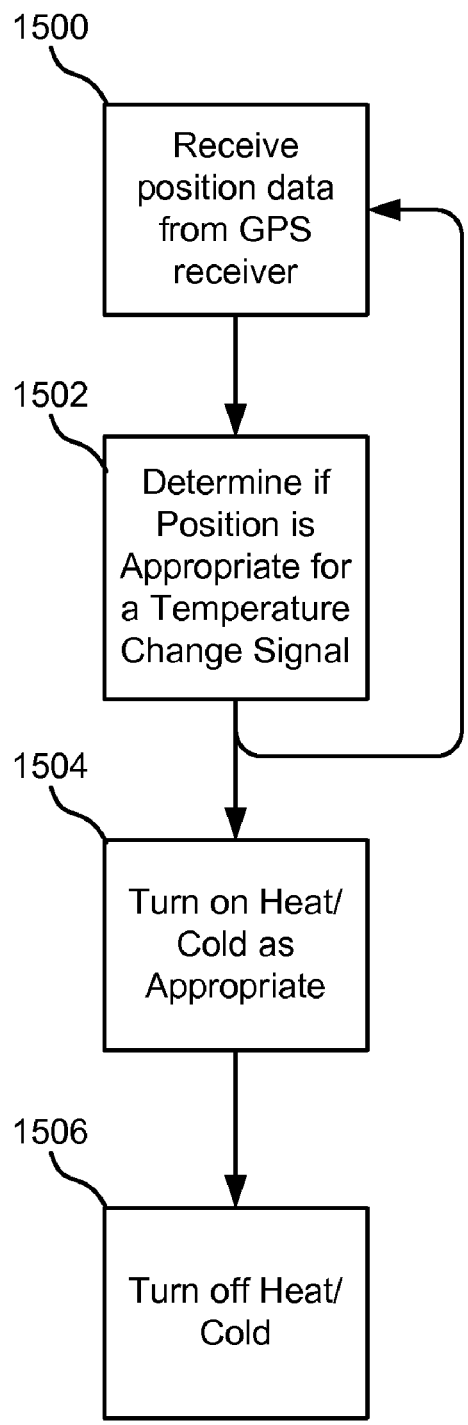
FIG. 15 is a process flow diagram of an embodiment method suitable for communication information regarding a location of the communication device.
Figure 16:
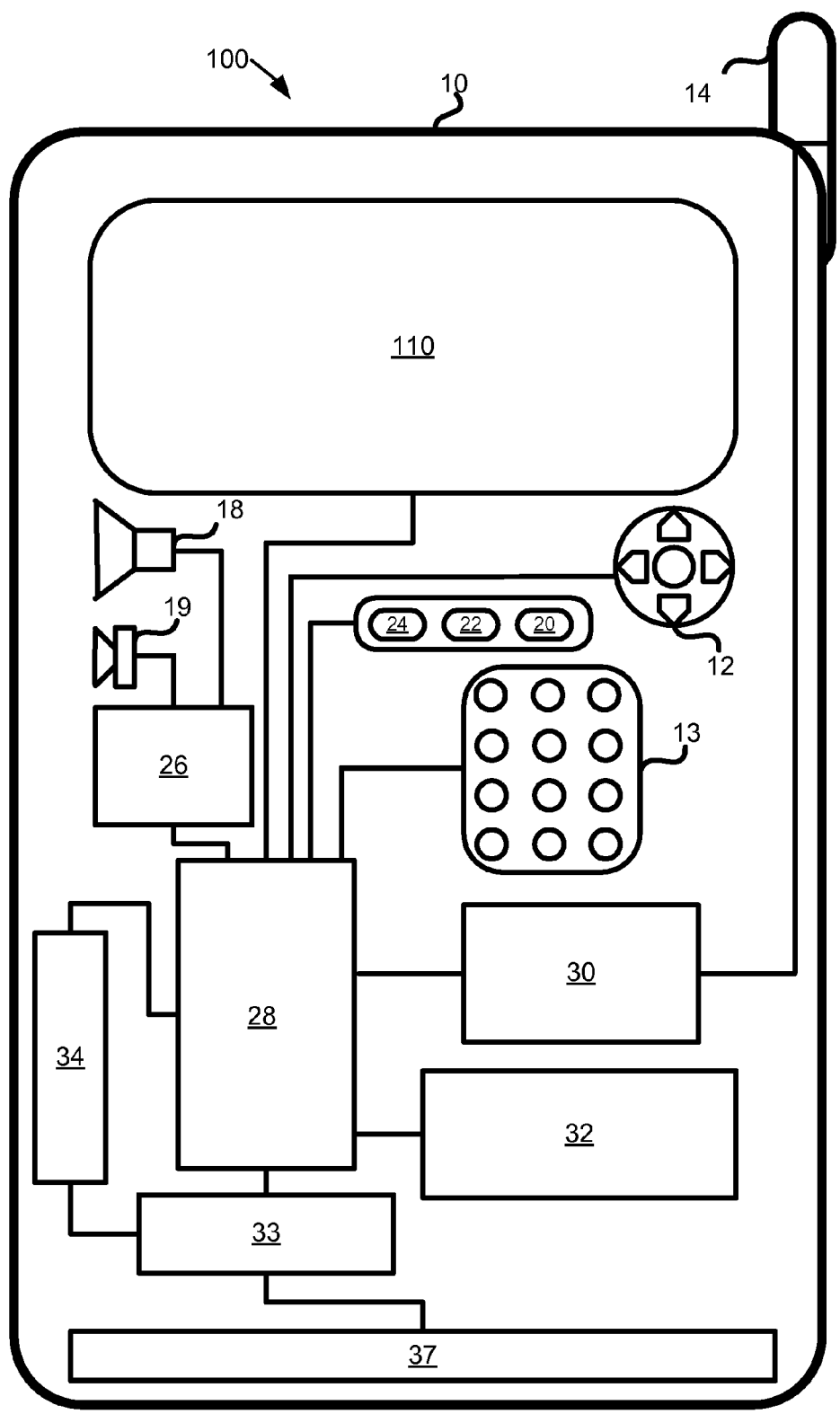
FIG. 16 is a component block of a communication device suitable for use with the various embodiments.

The process flow diagram shown in FIG. 15 illustrates example steps that may be implemented to communicate location information to a user by temperature changes. A communication device 100 may be configured with a GPS receiver 39 for receiving signals from a GPS satellite and determining from those signals global position coordinates. The processor 28 may be configured by software to receive coordinate information from the GPS receiver, step 1500, and compare the determined coordinates to a location-based criteria (such as proximity to a desired destination) to determine if a temperature change should be initiated, step 1502. Such a comparison may determine a relative distance from a destination coordinate and adjust the temperature to be exhibited on the exterior of the communication device 100 based upon the relative distance. For example, the processor 28 may be configured by software to activate the temperature modifying element 37 so the communication device 100 becomes hotter the closer it is to the desired destination. Based upon the results of the coordinate-to-criteria comparison in step 1502 the processor 28 may then signal the switch 33 to apply battery power to the thermal change element 37 (e.g., heating element 35 or thermoelectric element 36) to generate the appropriate temperature change, step 1504. As described above, the processor 28 may be configured by software to adjust the signals sent to the switch 33 so as to produce an approximate temperature or temperature range. After a period of time, which may be based on user settings, the processor 28 signals the switch 33 to disconnect battery power from the thermoelectric element 36, thereby turning off the temperature change, step 1506. Communication devices 100 implementing the embodiment method illustrated in FIG. 15 may have a variety of useful applications. For example, the method may be useful in helping users locate others in a social network, such as causing the communication device 100 to grow warmer as a user approaches another in the social network and to become colder as the user moves away. As another example, the method may help users locate addresses or geographic locations by becoming warmer as the user moves closer to the desired destination and becoming colder as the user moves away.

The embodiments described above may be implemented on any of a variety of communication devices, such as, for example, cellular telephones, personal data assistants (PDA) with cellular telephone, mobile electronic mail receivers, mobile web access devices, and other processor equipped devices that may be developed in the future. Further, the embodiments may be implemented on a variety of devices not ordinarily considered communication devices but which include the elements described above with reference to FIG. 1, including, for example, game controllers, displays for remote thermometers, electronic devices, alarm clocks, etc. In addition, the embodiments described above may be implemented on any of a variety of computing devices, including but not limited to desktop and laptop computers.

FIG. 15 depicts various components of a mobile handset communication device 100 capable of supporting the various embodiments disclosed herein. A typical mobile handset communication device 100 includes a processor 28 coupled to internal memory 32 and a user interface display 110. The mobile handset 10 may include an antenna 14 for sending and receiving electromagnetic radiation that is connected to a wireless data link and/or cellular telephone transceiver 30 coupled to the processor 28. In some implementations, the transceiver 30, and portions of the processor 28 and memory 32 used for cellular telephone communications are referred to as the air interface since the combination provides a data interface via a wireless data link. Further, the mobile device communication device 100 includes a speaker 18 to produce audible sound and a microphone 19 for sensing sound, such as receiving the speech of a user. Both the microphone 19 and speaker 18 may be connected to the processor 28 via a vocoder 26 which transforms analog electrical signals received from the microphone 19 into digital codes, and transform digital codes received from the processor 28 into analog electrical signals which the speaker 18 can transform into sound waves. In some implementations, the vocoder 26 may be included as part of the circuitry and programming of the processor 28. The mobile device also includes a switch 33 coupled to the processor, a battery 34 to provide power to the processor 28 and the switch 33 and at least one temperature modifying element 37, such as a electric resistance heating element 35 or a thermoelectric element 36, coupled to the switch 33. The circuit components may be enclosed within a case or housing 10. The temperature modifying element 37 may be thermally coupled to the housing 10 so as to readily conduct heat from/to the exterior surface.

The processor 28 may be any programmable microprocessor, microcomputer or multiple processor chip or chips that can be configured by software instructions (applications) to perform a variety of functions, including the functions of the various embodiments described above. In some communication device 100, multiple processors 28 may be provided, such as one processor dedicated to wireless communication functions and one processor dedicated to running other applications. Typically, software applications, such as user address book and calendar applications as well as applications implementing the various embodiments, may be stored in the internal memory 32 before they are accessed and loaded into the processor 28. In some mobile devices, the processor 28 may include internal memory sufficient to store the application software instructions. For the purposes of this description, the term memory refers to all memory accessible by the processor 28, including internal memory 32 and memory within the processor 28 itself. The memory 32 may be volatile or nonvolatile memory, such as flash memory, or a mixture of both. Mobile handsets communication device 100 typically include a key pad 13, as well as other hard keys 20, 22, 24 and menu selection buttons or rocker switches 12 for receiving user inputs.

The various embodiments may be implemented by the processor 28 executing software instructions configured to implement one or more of the described methods. Such software instructions may be stored in memory 32 as the device's operating system software, a series of APIs implemented by the operating system, or as compiled software implementing an embodiment method. Further, the software instructions may be stored on any form of tangible processor-readable memory, including: a random access memory 32, a memory module plugged into the mobile device 10, such as an SD memory chip, an external memory chip such as a USB-connectable external memory (e.g., a "flash drive"), read only memory (such as an EEPROM); hard disc memory, a floppy disc, and/or a compact disc.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

It is well known in the art that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for communicating information by changing a temperature of a communication device equipped with a temperature modifying element, comprising:
   determining whether a temperature change should be initiated based upon received temperature information selected from the group consisting of an outside temperature, an inside temperature, a temperature of another device, a temperature of another location, and a temperature of another geographic region, and upon comparing the temperature information to a temperature range criteria; and
   activating the temperature modifying element so as to generate a temperature commensurate with the temperature information if it is determined that a temperature change should be initiated.

2. The method of claim 1, wherein the temperature change is an increase in temperature.

3. The method of claim 1, wherein the temperature change is a decrease in temperature.

4. A method for communicating information by changing a temperature of a communication device equipped with a temperature modifying element, comprising:
   receiving an incoming telephone call;
   determining a caller telephone number from the incoming telephone call;

using the caller telephone number to locate a contact record within an address book database;

determining from a located contact record a priority designation assigned to the caller;

determining whether a temperature change should be initiated based upon the priority designation assigned to the caller; and activating the temperature modifying element if it is determined that a temperature change should be initiated.

5. A method for communicating information by changing a temperature of a communication device equipped with a temperature modifying element, comprising:

receiving an incoming e-mail message;

determining a sender address from the incoming e-mail message;

using the sender address to locate a contact record within an address book database;

determining from a located contact record a priority designation assigned to the sender;

determining whether a temperature change should be initiated based upon the priority designation assigned to the sender; and activating the temperature modifying element if it is determined that a temperature change should be initiated.

6. A method for communicating information by changing a temperature of a communication device equipped with a temperature modifying element, comprising:

receiving an incoming e-mail message;

determining a recipient address from the incoming e-mail message;

using the recipient address to locate a contact record within an address book database;

determining from a located contact record a priority designation assigned to the recipient;

determining whether a temperature change should be initiated based upon the priority designation assigned to the recipient; and activating the temperature modifying element if it is determined that a temperature change should be initiated.

7. A method for communicating information by changing a temperature of a communication device equipped with a temperature modifying element, comprising:

receiving an incoming e-mail;

determining a priority assigned to the e-mail by a sender;

determining whether a temperature change should be initiated based upon the priority assigned to the e-mail by a sender; and activating the temperature modifying element if it is determined that a temperature change should be initiated.

8. A method for communicating information by changing a temperature of a communication device equipped with a temperature modifying element, comprising:

recognizing a calendar event identified in a calendar application;

determining a priority assigned to the calendar event;

determining whether a temperature change should be initiated based upon the priority assigned to the calendar event; and activating the temperature modifying element if it is determined that a temperature change should be initiated.

9. A method for communicating information by changing a temperature of a communication device equipped with a temperature modifying element, comprising:

receiving position data;

determining whether a temperature change should be initiated based upon comparing the position data to a desired location to determine a proximity to the desired location; and activating a temperature modifying element so as to generate a temperature commensurate with the proximity to the desired location so as to become hotter when closer to the desired destination.

10. A communication device, comprising:

a processor;

a power supply coupled to the processor;

a temperature modifying element;

a switch coupled to the power supply, the temperature modifying element and the processor, the switch being configured to electrically connect the temperature modifying element to the power supply in response to a signal received from the processor;

a memory coupled to the processor; and a transceiver coupled to the processor, wherein the processor is configured with processor-executable instructions to perform steps comprising:

determining whether a temperature change should be initiated based upon data received in the form of temperature information selected from the group consisting of an outside temperature, an inside temperature, a temperature of another device, a temperature of another location, and a temperature of another geographic region and upon comparing the temperature information to a temperature range criteria; and activating the temperature modifying element if it is determined that a temperature change should be initiated so as to generate a temperature commensurate with the temperature information.

11. The communication device of claim 10, wherein the switch is integrated within the temperature modifying element.

12. The communication device of claim 10, wherein the temperature modifying element comprises an electric resistance heating element.

13. The communication device of claim 10, wherein the temperature modifying element comprises a thermoelectric element.

14. A communication device comprising:

a processor;

a power supply coupled to the processor;

a temperature modifying element;

a switch coupled to the power supply, the temperature modifying element and the processor, the switch being configured to electrically connect the temperature modifying element to the power supply in response to a signal received from the processor;

a memory coupled to the processor; and a transceiver coupled to the processor, wherein the processor is configured with processor executable instructions to perform steps comprising:

receiving an incoming telephone call;

determining a caller telephone number from the incoming telephone call;

using the caller telephone number to locate a contact record within an address book database;

determining from a located contact record a priority designation assigned to the caller;

determining whether a temperature change should be initiated based upon the priority designation assigned to the caller; and activating the temperature modifying element if it is determined that a temperature change should be initiated.

15. A communication device comprising:
a processor;
a power supply coupled to the processor;
a temperature modifying element;
a switch coupled to the power supply, the temperature modifying element and the processor, the switch being configured to electrically connect the temperature modifying element to the power supply in response to a signal received from the processor;
a memory coupled to the processor; and
a transceiver coupled to the processor,
wherein the processor is configured with processor executable instructions to perform steps further comprising:
receiving an incoming e-mail message;
determining a sender address from the incoming e-mail message;
using the sender address to locate a contact record within an address book database;
determining from a located contact record a priority designation assigned to the sender;
determining whether a temperature change should be initiated based upon the priority designation assigned to the sender; and
activating the temperature modifying element if it is determined that a temperature change should be initiated.

16. A communication device, comprising:
a processor;
a power supply coupled to the processor;
a temperature modifying element;
a switch coupled to the power supply, the temperature modifying element and the processor, the switch being configured to electrically connect the temperature modifying element to the power supply in response to a signal received from the processor;
a memory coupled to the processor; and
a transceiver coupled to the processor,
wherein the processor is configured with processor executable instructions to perform steps comprising:
receiving an incoming e-mail;
determining a priority assigned to the e-mail by a sender;
determining whether a temperature change should be initiated based upon the priority assigned to the e-mail by a sender; and
activating the temperature modifying element if it is determined that a temperature change should be initiated.

17. A communication device, comprising:
a processor;
a power supply coupled to the processor;
a temperature modifying element;
a switch coupled to the power supply, the temperature modifying element and the processor, the switch being configured to electrically connect the temperature modifying element to the power supply in response to a signal received from the processor;
a memory coupled to the processor; and
a transceiver coupled to the processor,
wherein the processor is configured with processor executable instructions to perform steps comprising:
receiving an incoming SMS message;
determining a recipient address from the incoming SMS message;
using the recipient address to locate a contact record within an address book database;
determining from a located contact record a priority designation assigned to the recipient;
determining whether a temperature change should be initiated based upon the priority designation assigned to the recipient; and
activating the temperature modifying element if it is determined that a temperature change should be initiated.

18. A communication device, comprising:
a processor;
a power supply coupled to the processor;
a temperature modifying element;
a switch coupled to the power supply, the temperature modifying element and the processor, the switch being configured to electrically connect the temperature modifying element to the power supply in response to a signal received from the processor;
a memory coupled to the processor; and
a transceiver coupled to the processor,
wherein the processor is configured with processor executable instructions to perform steps comprising:
recognizing a calendar event identified in a calendar application;
determining a priority assigned to the calendar event;
determining whether a temperature change should be initiated based upon the priority assigned to the calendar event; and
activating the temperature modifying element if it is determined that a temperature change should be initiated.

19. A communication device, comprising;
a processor;
a power supply coupled to the processor;
a temperature modifying element;
a switch coupled to the power supply, the temperature modifying element and the processor, the switch being configured to electrically connect the temperature modifying element to the power supply in response to a signal received from the processor;
a memory coupled to the processor; and
a GPS receiver coupled to the processor and configured to receive position data,
wherein the processor is configured with processor executable instructions to perform steps comprising:
determining whether a temperature change should be initiated based on received position data and on comparing the position data to a desired location-to determine a proximity to the desired location; and
activating the temperature modifying element if it is determined that a temperature change should be initiated so as to generate a temperature commensurate with the proximity to the desired location so as to become hotter when closer to the desired destination.

20. A communication device, comprising:
means for determining whether a temperature change should be initiated based upon received information in the form of temperature information selected from the group consisting of an outside temperature, an inside temperature, a temperature of another device, a temperature of another location, and a temperature of another geographic region, and upon comparing the temperature information to a temperature range criteria; and
means for generating a temperature change commensurate with the temperature information if it is determined that a temperature change should be initiated.

21. The communication device of claim 20, wherein the means for generating a temperature change comprises means for generating heat.

22. The communication device of claim 20, wherein the means for generating a temperature change comprises means for chilling a portion of an exterior of the communication device.

23. A communication device, comprising:
means for receiving an incoming telephone call;
means for determining a caller telephone number from the incoming telephone call;
means for using the caller telephone number to locate a contact record within an address book database;
means for determining from a located contact record a priority designation assigned to the caller;
means for determining whether a temperature change should be initiated based upon the priority designation assigned to the caller; and
means for generating a temperature change if it is determined that a temperature change should be initiated.

24. A communication device, comprising:
means for receiving an incoming e-mail message;
means for determining a sender address from the incoming e-mail message;
means for using the sender address to locate a contact record within an address book database;
means for determining from a located contact record a priority designation assigned to the sender;
means for determining whether a temperature change should be initiated based upon the priority designation assigned to the sender; and
means for generating a temperature change if it is determined that a temperature change should be initiated.

25. A communication device, comprising:
means for receiving an incoming e-mail message;
means for determining a priority assigned to the e-mail by a sender;
means for determining whether a temperature change should be initiated based upon the priority designation assigned to the e-mail by the sender; and
means for generating a temperature change if it is determined that a temperature change should be initiated.

26. A communication device, comprising:
means for receiving an incoming SMS message;
means for determining a sender telephone number from the incoming SMS message;
means for using the sender telephone number to locate a contact record within an address book database;
means for determining from a located contact record a priority designation assigned to the sender;
means for determining whether a temperature change should be initiated based upon the priority designation assigned to the sender; and
means for generating a temperature change if it is determined that a temperature change should be initiated.

27. A communication device, comprising:
means for recognizing a calendar event identified in a calendar application;
means for determining a priority assigned to the calendar event;
means for determining whether a temperature change should be initiated based upon the priority assigned to the calendar event; and
means for generating a temperature change if it is determined that a temperature change should be initiated.

28. A communication device, comprising:
means for receiving position data;
means for determining whether a temperature change should be initiated based upon comparing the position data to a desired location to determine a proximity to the desired location; and
means for generating a temperature commensurate with the proximity to the desired location so as to become hotter when closer to the desired destination.

29. A non-transitory tangible storage medium having stored thereon processor-executable software instructions that would cause a processor of a mobile device to perform steps comprising:
receiving temperature data selected from the group consisting of an outside temperature, an inside temperature, a temperature of another device, a temperature of another location, and a temperature of another geographic region;
determining whether a temperature change should be initiated based upon comparing the received temperature data to temperature range criteria; and
activating a temperature modifying element so as to generate a temperature commensurate with the temperature information if it is determined that a temperature change should be initiated.

30. A non-transitory storage medium having stored thereon processor-executable software instructions that would cause a processor of a mobile device to perform steps comprising:
receiving a telephone call;
determining a caller telephone number from the incoming telephone call;
using the caller telephone number to locate a contact record within an address book database;
determining from a located contact record a priority designation assigned to the caller;
determining whether a temperature change should be initiated based upon the priority designation assigned to the caller; and
activating a temperature modifying element if it is determined that a temperature change should be initiated.

31. A non-transitory storage medium having stored thereon processor-executable software instructions that would cause a processor of a mobile device to perform steps comprising:
receiving an incoming e-mail message;
determining a sender address from the incoming e-mail message;
using the sender address to locate a contact record within an address book database;
determining from a located contact record a priority designation assigned to the sender;
determining whether a temperature change should be initiated based upon the priority designation assigned to the sender; and
activating a temperature modifying element if it is determined that a temperature change should be initiated.

32. A non-transitory storage medium having stored thereon processor-executable software instructions that would cause a processor of a mobile device to perform steps comprising:
receiving an incoming SMS message;
determining a recipient address from the incoming SMS message;
using the recipient address to locate a contact record within an address book database;
determining from a located contact record a priority designation assigned to the recipient;
determining whether a temperature change should be initiated based upon the priority designation assigned to the recipient; and activating a temperature modifying element if it is determined that a temperature change should be initiated.

33. A non-transitory storage medium having stored thereon processor-executable software instructions that would cause a processor of a mobile device to perform steps comprising:
   receiving an incoming e-mail;
   determining a priority assigned to the e-mail by a sender;
   determining whether a temperature change should be initiated based upon the priority assigned to the e-mail by a sender; and
   activating a temperature modifying element if it is determined that a temperature change should be initiated.

34. A non-transitory storage medium having stored thereon processor-executable software instructions that would cause a processor of a mobile device to perform steps comprising:
   recognizing a calendar event identified in a calendar application;
   determining a priority assigned to the calendar event;
   determining whether a temperature change should be initiated based upon the priority assigned to the calendar event; and
   activating a temperature modifying element if it is determined that a temperature change should be initiated.

35. A non-transitory storage medium having stored thereon processor-executable software instructions that would cause a processor of a mobile device to perform steps comprising:
   receiving position data;
   determining whether a temperature change should be initiated based upon comparing the position data to a desired location to determine a proximity to the desired location; and
   activating a temperature modifying element so as to generate a temperature commensurate with the proximity to the desired location so as to become hotter when closer to the desired destination.

* * * * *